United States Patent
Harrow et al.

(10) Patent No.: US 7,562,112 B2
(45) Date of Patent: *Jul. 14, 2009

(54) METHOD AND APPARATUS FOR PEER-TO-PEER SERVICES FOR EFFICIENT TRANSFER OF INFORMATION BETWEEN NETWORKS

(75) Inventors: Ivan P. Harrow, Navan (IE); David O. Fleming, Killarney (IE); Frank X Daly, Killiney (IE); Dermot E. Honan, Leixlip (IE); Martin G. Curley, Maynooth (IE)

(73) Assignee: Intel Corporation, Santa Clara, CA (US)

( * ) Notice: Subject to any disclaimer, the term of this patent is extended or adjusted under 35 U.S.C. 154(b) by 548 days.

This patent is subject to a terminal disclaimer.

(21) Appl. No.: 10/095,323

(22) Filed: Mar. 8, 2002

(65) Prior Publication Data

US 2003/0009518 A1 Jan. 9, 2003

Related U.S. Application Data

(60) Provisional application No. 60/303,706, filed on Jul. 6, 2001.

(51) Int. Cl.
   *G06F 15/16* (2006.01)
(52) U.S. Cl. .................. 709/203; 709/217; 709/246
(58) Field of Classification Search .............. 709/203, 709/217, 219, 227, 238, 246; 713/153, 201; 715/738

See application file for complete search history.

(56) References Cited

U.S. PATENT DOCUMENTS

| | | | |
|---|---|---|---|
| 4,914,571 A | 4/1990 | Baratz et al. | |
| 5,243,592 A | 9/1993 | Perlman et al. | |
| 5,287,500 A | 2/1994 | Stoppani, Jr. | |
| 5,367,698 A | 11/1994 | Webber et al. | |
| 5,495,470 A | 2/1996 | Tyburski et al. | |
| 5,592,626 A | 1/1997 | Papadimitriou et al. | |
| 5,828,838 A | 10/1998 | Downs et al. | |
| 5,963,546 A | 10/1999 | Shoji | |
| 5,987,233 A | 11/1999 | Humphrey | |

(Continued)

FOREIGN PATENT DOCUMENTS

EP 926608 A2 6/1999

(Continued)

OTHER PUBLICATIONS

Mojo Nation Docs: "Technology Overview of Mojo Nation" Internet Citation, Feb. 14, 2000, XP002177454.

(Continued)

*Primary Examiner*—Saleh Najjar
*Assistant Examiner*—Vitali Korobov
(74) *Attorney, Agent, or Firm*—Blakely, Sokoloff, Taylor & Zafman LLP

(57) ABSTRACT

A method and apparatus for peer-to-peer services have been described. In one embodiment, a request for data is received from a first local device. A determination of a second local device having the data is made. The first local device is directed to the second local device to directly obtain the data from the second local device. A direct transfer of the data from the second local device to the first local device is performed.

15 Claims, 24 Drawing Sheets

U.S. PATENT DOCUMENTS

| | | | |
|---|---|---|---|
| 6,029,175 | A | 2/2000 | Chow et al. |
| 6,058,394 | A | 5/2000 | Bakow et al. |
| 6,078,919 | A | 6/2000 | Ginzburg et al. |
| 6,098,091 | A | 8/2000 | Kisor |
| 6,185,601 | B1 | 2/2001 | Wolff |
| 6,260,069 | B1 | 7/2001 | Anglin |
| 6,260,072 | B1 | 7/2001 | Rodriguez-Moral |
| 6,349,351 | B1 | 2/2002 | Shimizu et al. |
| 6,366,907 | B1 | 4/2002 | Fanning et al. |
| 6,411,997 | B1 | 6/2002 | Dawes |
| 6,463,471 | B1 | 10/2002 | Dreke et al. |
| 6,483,808 | B1 | 11/2002 | Rochberger et al. |
| 6,519,636 | B2 | 2/2003 | Engel et al. |
| 6,535,488 | B1 | 3/2003 | Mahe |
| 6,553,376 | B1 | 4/2003 | Lewis et al. |
| 6,574,716 | B2 | 6/2003 | Dovi |
| 6,606,643 | B1 | 8/2003 | Emens et al. |
| 6,647,412 | B1 | 11/2003 | Strandberg et al. |
| 6,647,413 | B1 | 11/2003 | Walrand et al. |
| 6,675,177 | B1 | 1/2004 | Webb |
| 6,701,415 | B1 | 3/2004 | Hendren, III |
| 6,735,623 | B1 | 5/2004 | Prust |
| 6,742,028 | B1* | 5/2004 | Wang et al. .......... 709/223 |
| 6,766,354 | B1 | 7/2004 | Jardin et al. |
| 6,778,652 | B2 | 8/2004 | Gaus et al. |
| 6,938,095 | B2 | 8/2005 | Basturk et al. |
| 6,983,095 | B2 | 8/2005 | Basturk et al. |
| 7,047,406 | B2* | 5/2006 | Schleicher et al. .......... 713/168 |
| 7,099,871 | B2 | 8/2006 | Faybishenko et al. |
| 7,349,902 | B1 | 3/2008 | Arlitt et al. |
| 2001/0010059 | A1 | 7/2001 | Burman |
| 2002/0007350 | A1 | 1/2002 | Yen |
| 2002/0009088 | A1* | 1/2002 | Donaghey et al. .......... 370/397 |
| 2002/0027567 | A1 | 3/2002 | Niamir |
| 2002/0049760 | A1* | 4/2002 | Scott et al. .......... 707/10 |
| 2002/0065899 | A1 | 5/2002 | Smith et al. |
| 2002/0073204 | A1* | 6/2002 | Dutta et al. .......... 709/227 |
| 2002/0098849 | A1 | 7/2002 | Bloebaum et al. |
| 2002/0103998 | A1* | 8/2002 | DeBruine .......... 713/153 |
| 2002/0112073 | A1 | 8/2002 | MeLampy et al. |
| 2002/0112076 | A1 | 8/2002 | MeLampy et al. |
| 2002/0124080 | A1 | 9/2002 | Leighton et al. |
| 2002/0138552 | A1* | 9/2002 | DeBruine et al. .......... 709/203 |
| 2002/0138744 | A1* | 9/2002 | Schleicher et al. .......... 713/187 |
| 2002/0143918 | A1 | 10/2002 | Soles et al. |
| 2002/0147842 | A1 | 10/2002 | Breitbart et al. |
| 2002/0163882 | A1 | 11/2002 | Bornstein et al. |
| 2002/0165979 | A1 | 11/2002 | Vincent |
| 2002/0188735 | A1 | 12/2002 | Needham et al. |
| 2003/0061287 | A1 | 3/2003 | Yu et al. |
| 2003/0163472 | A1 | 8/2003 | Hartley et al. |
| 2004/0042403 | A1 | 3/2004 | Xu et al. |
| 2004/0052339 | A1 | 3/2004 | Mirashrafi et al. |
| 2004/0098502 | A1 | 5/2004 | Xu et al. |
| 2004/0192275 | A1 | 9/2004 | Kim |

FOREIGN PATENT DOCUMENTS

| | | |
|---|---|---|
| EP | 0993163 A1 | 4/2000 |
| JP | 11328050 | 11/1999 |
| WO | WO 00/77606 A2 | 12/2000 |
| WO | WO 01/04756 A1 | 1/2001 |
| WO | WO 01/06368 A1 | 1/2001 |
| WO | WO 01/39470 A1 | 5/2001 |
| WO | WO 01/52198 A2 | 7/2001 |

OTHER PUBLICATIONS

Kangasharju J et al: "Locating Copies of Objects Using the Domain Name System" Proceedings of the International Caching Workshop, XX, XX, 1999, pp. 1-12, XP002197618.

LMAX: "FXP Tutorial source: The Ultimate board" Internet Citation:, 'Online! Mar. 1, 2000 XP002232596 Retrieved from internet: <URL: http://www.flexfxp.com/forums/fxptutorial.html>, retrieved on Feb. 25, 2003!.

Stirling A: "Mobile Multimedia Platforms" VTC 2000-Fall. IEEE VTS 52$^{nd}$. Vehicular Technology Conference, Boston, MA, Sep. 24-28, 2000, IEEE Vehicular Technology Conferences, New York, NY: IEEE, US, vol. 6 of 6. Conf. 52, Sep. 24, 2000, pp. 2541-2548, XP001033003 ISBN: 0-7803-6508-9.

Brisco T: "RFC 1794—DNS Support for Load Balancing" Request for Comments, Apr. 1995, XP-002209416.

Postel J et al: "RFC 959—FTP—File Transfer Protocol" Request for Comments, Oct. 1, 1985, XP-002144723.

International Search Report, PCT/US02/21020; 4 pages.

International Search Report, PCT/US02/21018; 4 pages.

International Search Report, PCT/US02/21205; 4 pages.

Loshin, "What's old is new", Jan. 2001, Boardwatch. Golden, vol. 15, Issue 1, pp. 38ff.

Gartner Consulting, "The Emergence of Distributed Content Management and Peer-to-Peer Content Networks", Jan. 2001, Gartner Group, pp. 1-20.

Lewis, "Napster Rocks the Web", Jun. 29, 2000, from The New York Times online, http://archive.nytimes.com/library/tech/00/06/circuits/articles/29pete.html, printout pp. 1-5.

\* cited by examiner

Initial view of SLS at startup

View of SLS after browsing to a category

View of SLS after selecting a file for download

View of SLS during a file download

View of SLS during File Search

View of SLS Publisher menu to add, update, or delete content

View of SLS while adding new content

METHOD AND APPARATUS FOR PEER-TO-PEER SERVICES FOR EFFICIENT TRANSFER OF INFORMATION BETWEEN NETWORKS

RELATED APPLICATION

The present patent application claims priority of U.S. Provisional Application Serial No. 60/303,706 filed Jul. 6, 2001 titled "Share and Learn Software", which is hereby incorporated herein by reference.

FIELD OF THE INVENTION

The present invention pertains to networks. More particularly, the present invention relates to a method and apparatus for peer-to-peer services.

BACKGROUND OF THE INVENTION

Many companies are adopting the use of networks for sharing information. The Internet and Intranets are examples of such a networks. This information may be shared within a company, university, local group, or to users around the world, etc.

As the information shared becomes richer in content, such as streaming video, etc., it may place more demands on servers, which may lower available bandwidth, and slow down access to the information on, for example, a Wide Area Network (WAN), etc. One approach to improving performance is to "widen the pipe" or bandwidth that the WAN may handle. This may be a very expensive approach particularly where peak or spikes in traffic may be a limiting factor. This may present a problem.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and apparatus for peer-to-peer services are described.

The present invention by providing a capability whereby network traffic may be shifted to another network may allow more efficient transfer of information, data, etc. One such example of shifting network traffic may be shifting WAN traffic to LAN peer-to-peer traffic.

Both a WAN such as the Internet and a WAN such as a corporate Intranet may find this traffic shifting capability to be useful. To better illustrate the present invention, references will be made to an Intranet, however, one of ordinary skill in the art will recognize that the present invention may be practiced on other networks, such as the Internet.

Intranets and particularly large corporate Intranets are host to, and are sharing and transferring, much more information than in the past. The advent of streaming video is an example of content which may require more instantaneous bandwidth than the network was designed for. Shifting WAN traffic to a LAN communication may free up WAN bandwidth. If a server based content is able to be placed on a client on a LAN, then another client on the LAN may be able to access the information through peer-to-peer client interaction. This shifting of WAN server based content to a LAN client for peer-to-peer transfer allows for file sharing.

Figure 1:
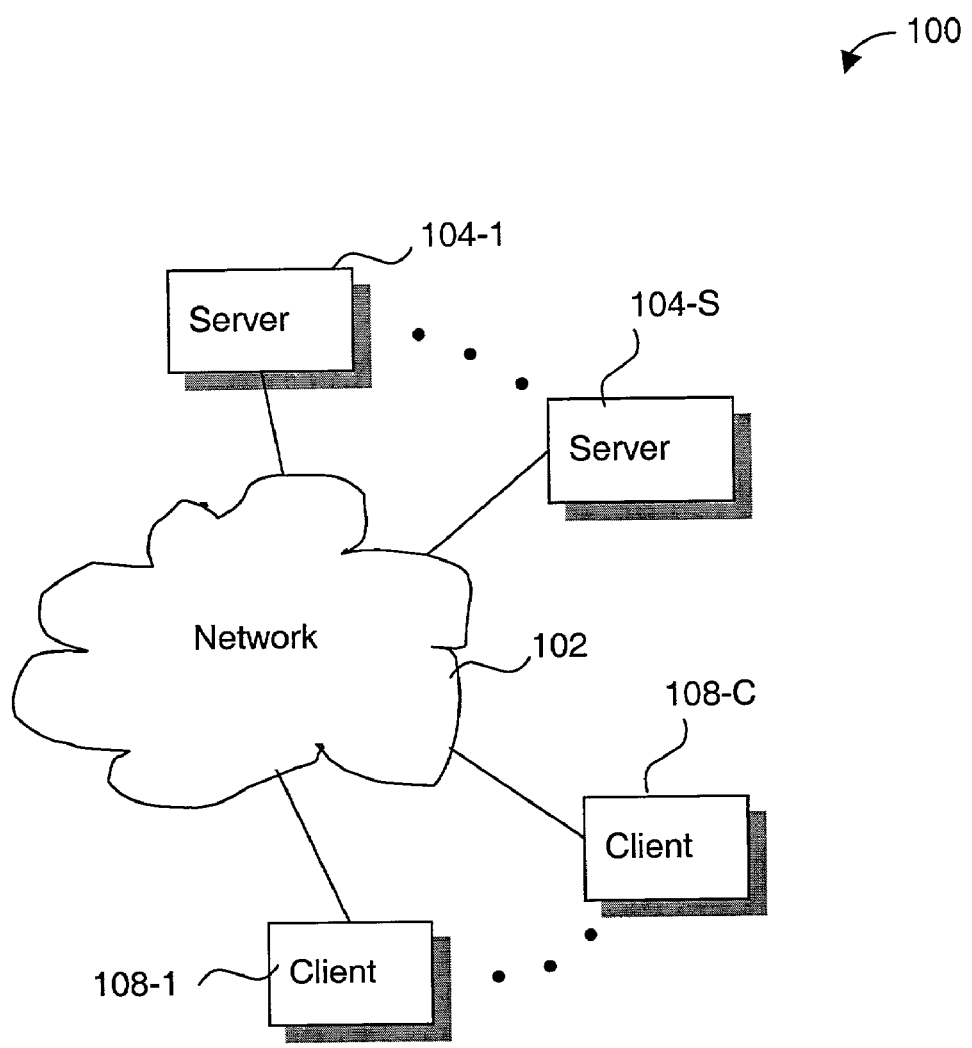
FIG. 1 illustrates a network environment in which the method and apparatus of the present invention may be implemented.

FIG. 1 illustrates a network environment 100 in which the techniques described may be applied. The network environment 100 has a network 102 that connects S servers 104-1 through 104-S, and C clients 108-1 through 108-C. More details are described below.

Figure 2:
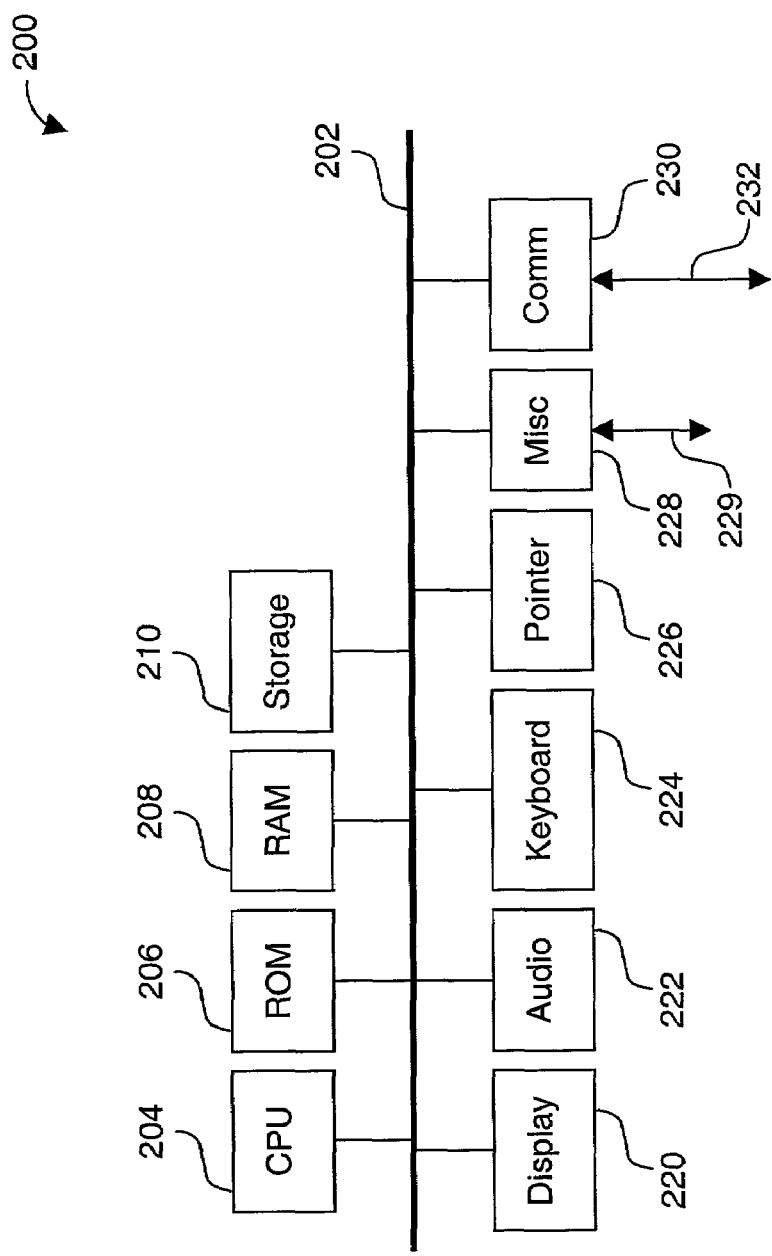
FIG. 2 is a block diagram of a computer system.

FIG. 2 illustrates a computer system 200 in block diagram form, which may be representative of any of the clients and/or servers shown in FIG. 1. More details are described below.

Figure 3:
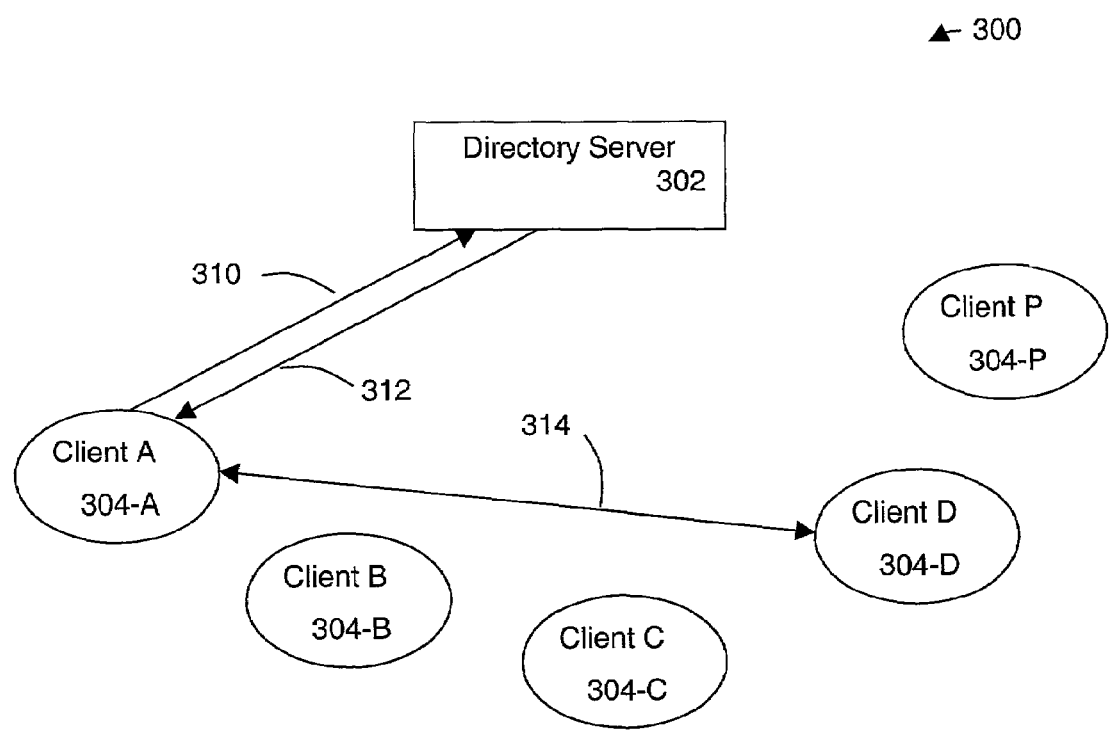
FIG. 3 illustrates one embodiment of the present invention being used for file sharing.

FIG. 3 illustrates one embodiment of the present invention 300 being used for file sharing. Directory Server 302 maintains a directory of where files are located. Client A 304-A makes a file request 310 to directory server 302. Directory server 302 looks to see where the file is located by referencing a prioritized list of closest clients with the latest revision of the file. The directory server 302 communicates the location of the file 312 to Client A. In this illustration that communication 312 conveys to Client A 304-A that Client D 304-D has a copy of the file. Client A 304-A then communicates 314 with Client D 304-D and gets the file located on Client D 304-D. The communication 314 between Client A 304-A and Client D 304-D is a peer-to-peer communication.

Thus, rather than Client A 304-A having to retrieve the file from a server possibly located on a WAN, the directory server 302 has communicated to Client A 304-A that the file may be retrieved from another Client D 304-D. Thus, traffic that may have originally had to occur on a WAN has been shifted to a peer-to-peer transfer, possibly on a LAN Note that since directory server 302 maintains a list of files and locations, after Client A 304-A has a copy of the file, directory server 302 will have this information also. Now, for example, if Client B 304-B requests from directory server 302 a copy of the file, the directory server 302 would know that Client A 304-A and Client D 304-D both have copies. Directory server 302 may then inform Client B 304-B that Client A 304-A is the nearest client that has a copy. Client B 304-B may then effect a peer-to-peer transfer with Client A 304-A.

After this transfer, directory sever 302 would then know that Clients A 304-A, Client B 304-B, and Client D 304-D have a copy of the file.

One of ordinary skill in the art will appreciate that the file sharing approach may "propagate" files across networks. This propagation will allow directory server 302 to communicate to any requesting client the closest client having a file for a transfer. When the clients are located on the same local network then a LAN peer-to-peer transfer will be possible. LAN transfers are generally faster than WAN to LAN transfers because of fewer intervening routers, switches, proxies, firewalls, etc.

If there is no local client that has the file requested, then the directory server 302 may direct the client to get the file from a client on a WAN and/or a file server. For example, Client D 304-D may have originally placed a file request with the directory server 302 and been informed that there was no copy of the file on a local client. Client D 304-D may have had to obtain a copy of the file, for example, over the Internet from some remote server. Once Client D 304-D has a copy of the file, directory server 302 knows this and so as explained above, if Client A 304-A then requests the file directory server 302 can inform Client A 304-A that Client D 304-D has a copy.

As discussed above, the capability for shifting of WAN server based content to a LAN client for peer-to-peer transfer allows for file sharing. One of ordinary skill in the art will appreciate that by practicing the present invention in such an environment, a client based proxy service used to redirect data transfers from the network in a peer-to-peer environment may be achieved. That is, by redirecting, for example, Internet web requests to a more local network copy of the file, a web proxy service may be effected with the present invention.

Figure 4:
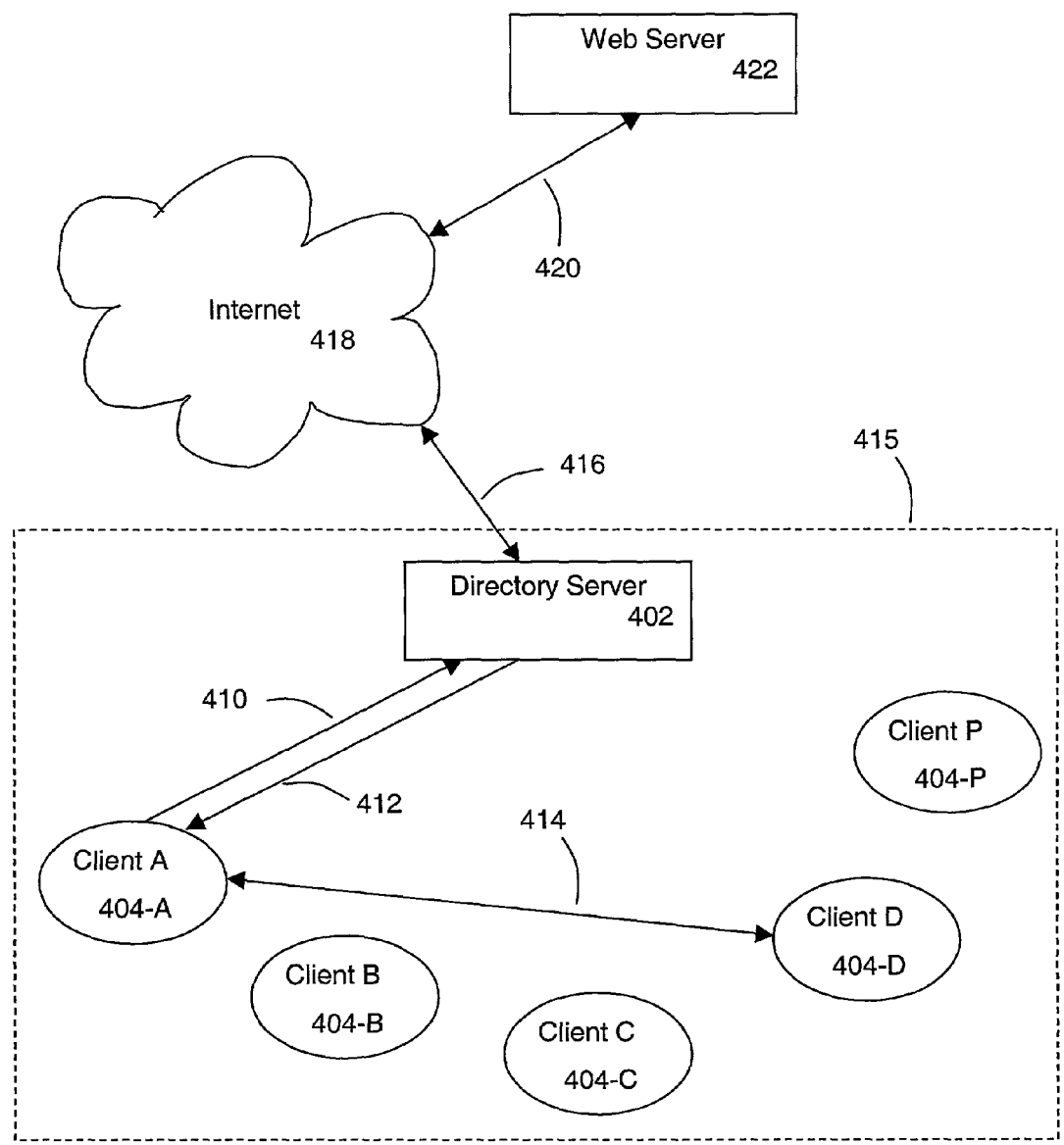
FIG. 4 illustrates one embodiment of the present invention being used as a web proxy service.

FIG. 4 illustrates one embodiment of the present invention 400 being used as a web proxy service. Directory Server 402 maintains a directory of where web files are located on a local network 415. Client A 404-A makes a file request 410 (via, for example, surfing the web) to directory server 402. Directory server 402 looks to see where the file may be located on the local network 415 by referencing a prioritized list of closest clients with the latest version of the file. The directory server 402 communicates 412 the location of the file to Client A 404-A. In this illustration that communication 412 conveys to Client A 404-A that Client D 404-D has a copy of the file and redirects Client A 404-A to get the file located on Client D 404-D. The communication 414 between Client A 404-A and Client D 404-D is a peer-to-peer communication.

Thus, rather than Client A 404-A having to retrieve the file from a web server 422 connected via 420 to the Internet 418, and via connection 416 to the directory server 402, Client A 404-A has retrieved the file from Client D 404-D. Thus, possible Internet traffic has been redirected resulting in a peer-to-peer transfer, possibly on a LAN. Thus, "local" storage of the file, plus the redirection allowing access to the local copy of the file, serves the function of a proxy.

Note that since directory server 402 maintains a list of files and locations, after Client A 404-A has a copy of the file, directory server 402 will have this information also. Now, for example, if Client B 404-B requests the same file while, for example, web browsing, the directory server 402 would know that Client A 404-A and Client D 404-D both have copies. Directory server 402 may then inform Client B 404-B that Client A 404-A is the nearest client that has a copy. Client B 304-B may then affect a peer-to-peer transfer with Client A 404-A. After this transfer, directory sever 402 would then know that Clients A 404-A, Client B 404-B, and Client D 404-D have a copy of the file.

One of ordinary skill in the art will appreciate that this file sharing approach may "propagate" web files across networks. Web sites have information that changes on a regular basis. As was detailed previously, the directory server 402 maintains where the latest files are located. Thus, for example, assume it is time X, in FIG. 4, where Client A 404-A has retrieved a copy of the file from Client D 404-D. Assume next that at time X+10 minutes, Client B 404-B requests the same file. If directory server 402 is aware of a more recent copy of the file, it will direct Client B 404-B to retrieve the file from that location. This will also be the situation, where, for example, Client A 404-A has a local copy of the file at time X, but at time X+10 minutes requests the file again. If the most recent copy is on Client A 404-A then the directory server 402 will direct Client A 404-A to Client A 404-A. If the most recent copy is on another client, say for example, Client C 404-C, then the directory server 402 will direct Client A 404-A to Client 404-C for the copy. The directory server 402 will direct Client A 404-A to the web for a copy if there is no copy available on the local network 415. If the most recent copy is on the web, then the directory server 402 may direct Client A 404-A to the web for a copy.

The directory server 402 may also have an expiration timeout feature. That is, after say 10 minutes, the directory server 402 may direct a client to retrieve a copy of the file from the web server 422. In this way web content on a local network would be updated after being on the local network for more than 10 minutes. This timeout feature may be tailored to the web content. For example, a website dealing with word definitions may not need to be updated as frequently as a website having current news events.

As discussed above, the capability for shifting of WAN server based content to a LAN client for peer-to-peer transfer allows for file sharing. The clients discussed above were assumed, for convenience of discussion, to be connected to the network for most of the time. This may not be the case. For example, portable computers, PDAs, etc. may be connected and disconnected as needed. One example may be a sales office, where the outside sales people only connect to the network when they are in the office. Portable computers may not be connected to the network long enough to download a large file, such as a video presentation. This may be due to a time constraint or a bandwidth constraint. However, if the user of the portable computer could affect a LAN peer-to-peer transfer of the information, the bandwidth may be higher than from, for example, a server on the WAN. By allowing the user of the portable to select what information needs to be downloaded and having that information directed to a nearby client on the LAN, then the next time the user connects to the network, a LAN peer-to-peer transfer may be possible. Thus, the portable computer user, in effect, is a third party controlling the WAN to LAN transfer.

Figure 5:
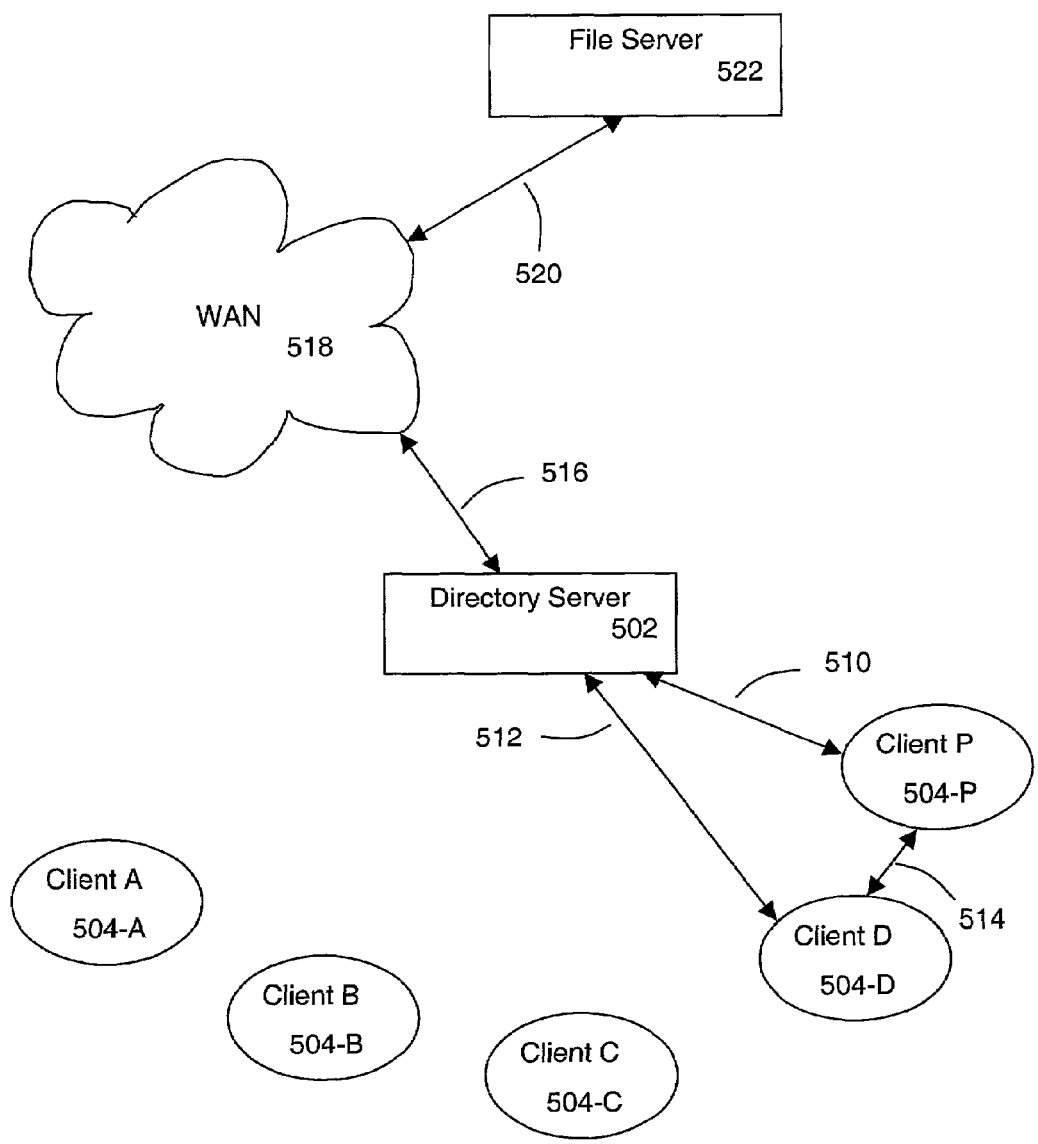
FIG. 5 illustrates one embodiment of the present invention where a third party is controlling the content transfer between clients across a WAN/LAN.

FIG. 5 illustrates one embodiment of the present invention 500 where a third party is controlling the WAN to LAN transfer. Here, Client P 504-P represents a portable client such as a portable computer or PDA. Client P 504-P may need a file from File Server 522. A request 510 to directory server 502 may indicate that there is no local copy on Client A, B, C, D, or P (504-A through P, respectively). At this point Client P 504-P may decide to either stay online and download the file or direct that it be downloaded to the nearest client. If the latter choice is selected, then the directory server 502 may determine that Client D 504-D is the nearest client and direct that the download of the file from File server 522 be directed to Client D 504-D. This transfer (via 522, 520, 518, 502, 512) may occur with Client P 504-P either presently connected to the network or disconnected. When the file has been downloaded to Client D 504-D, the directory server 502 has this information stored, and so when Client P 504-P again connects to the network and requests the file, a local peer-to-peer transfer 514 from Client D 504-D to Client P 504-P is possible. In another embodiment, the local peer-to-peer transfer 514 from Client D 504-D to Client P 504-P may be initiated automatically when Client P 504-P is connected to the network and Client D 504-D has the file locally. Again, once Client P 504-P has transferred the file, directory server 502 is aware that Client D 504-D and now Client P 504-P both have copies of the file. The device referred to in this section as the File Server 522 may also be another device, such as, a client on a remote network, etc.

In another embodiment, when Client P 504-P is connected to the network, directory server 502 may query Client P 504-P to see if Client P 504-P has selected files to be downloaded while offline. This download list may have previously been retrieved from a directory file server (either 502 and/or other directory file servers).

In another embodiment, when Client P 504-P is connected to the network, files resident on Client P 504-P may be communicated to a directory server, such as directory server 502. If new files, or files modified having a more recent date are communicated to directory server 502, then other clients will now have access to these files. Thus, for example, a portable computer used by a salesperson may be used to detail customer visit information while the salesperson is at the customer. Upon returning to the sales office and plugging into the network, the Client P 504-P may send to the directory server 502 information regarding files on Client P 504-P. These updated files would then be available via directory server 502 knowing they were on Client P 504-P.

In another embodiment, when Client P 504-P returns with updated files, the directory server 502 and/or the Client P 504-P may direct that a local copy of the updated files be made on a non-portable computer. In this embodiment then, the third party control may effect a transfer of files so that when the portable client is disconnected from the network a local copy is available to the rest of the network. The directory server 502 and/or the Client P 504-P may also direct that a copy of the updated files be sent to a central and/or web server. Thus, third party control of transfers is to and from any source and/or destination. The ability for a portable client, such as Client P 504-P to send files to another client serves as a backup of those files.

New and updated files are not limited to a portable client, such as Client P 504-P. Other clients, such as desktop clients, with new files or updated files may also use the techniques discussed above. Thus, in one embodiment of the present invention clients may use the network services for distributed backup and storage. Clients are not the only source of content and In yet another embodiment, files from all sources, clients, servers, etc., may make use of the present invention to effect shifting of content for distributed backup and storage.

Figure 6:
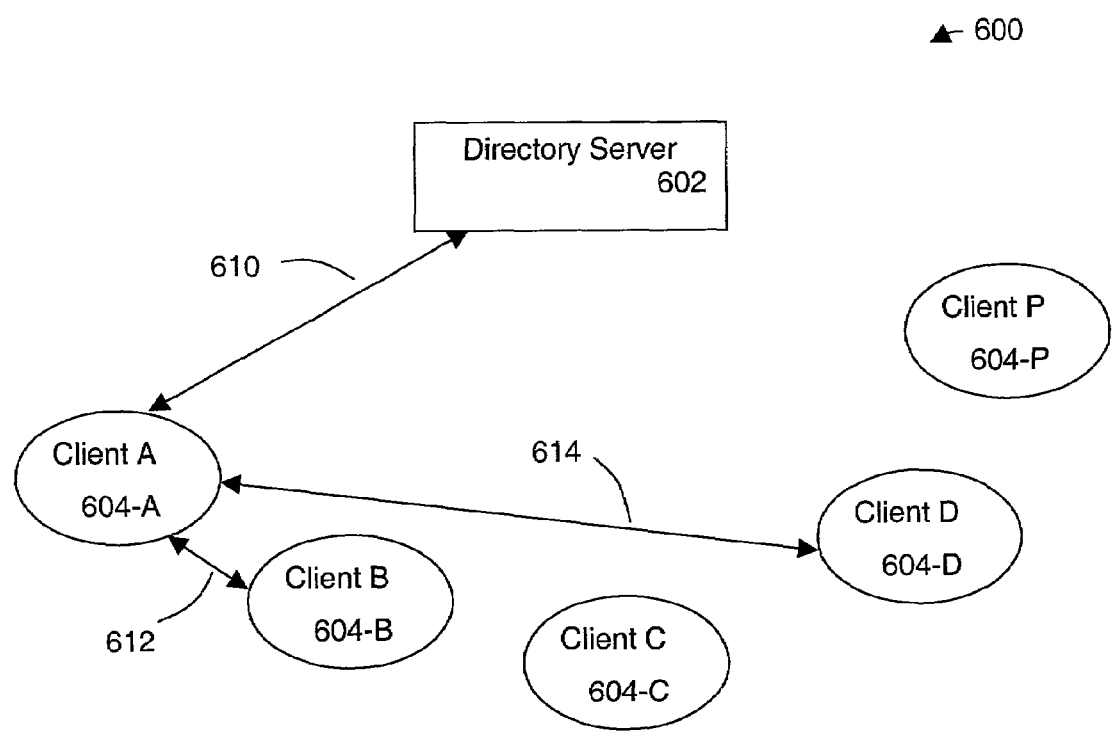
FIG. 6 illustrates one embodiment of the present invention being used for distributed backup and storage.

FIG. 6 illustrates one embodiment 600 of the present invention being used for distributed backup and storage. Client A 604-A communicates with directory server 602 via link 610 a request to store a local file which is located on Client A 604-A on another client or clients. Directory server 602 informs Client A 604-A that Client B 604-B and Client D 604-D are nearest and have available storage. Client A 604-A then transfers the files or parts of the files to Client B 604-B via link 612. If more storage is needed and/or a distributed backup was requested, then Client A 604-A may transfer files via 614 to Client D 604-D. These transfers are peer-to-peer and may occur on a LAN. In this example, the client has initiated the backup request. In another embodiment of the present invention, the backup request may originate from the directory server 604 and/or may originate from a file server on a network.

As discussed above, the capability for shifting of content from one network to another allows for many capabilities. Reference has been made to clients, servers, WAN, LAN, peer-to-peer, etc. In many cases the benefit of peer-to-peer transfers occurs when the clients are "nearest" to each other. From a network viewpoint the "nearest" client for file sharing, transfer, etc. may not be the closest physically. From a network performance standpoint the "nearest" client may be that client and/or clients, that may transfer the information the fastest. Thus, all the above approaches for shifting traffic may benefit from such an analysis of the network. One such approach to generating the "nearest" client information may use router table analysis.

Figure 7:
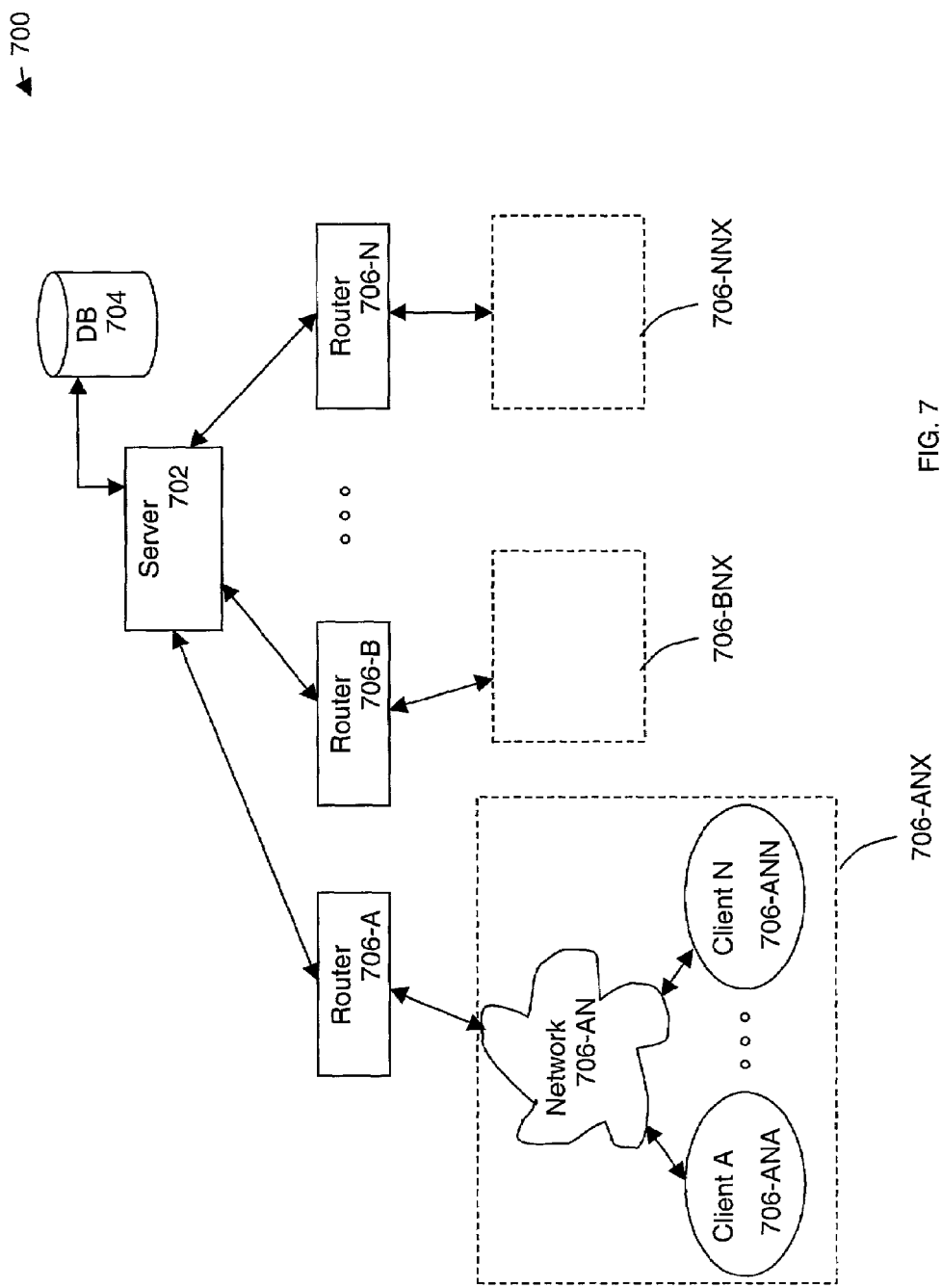
FIG. 7 illustrates one embodiment of the present invention using router table analysis for a network.

FIG. 7 illustrates one embodiment 700 of the present invention using router table analysis for a network. Server 702 is connected to routers 706-A through 706-N. Each router (706-A through 706-N) is connected to a respective group 706-ANX through 706-NNX. Each group (706-ANX through 706-NNX) includes a Network 706-AN through 706-NN respectively and respective Clients A through N. Database 704 is connected to the server 702. During operation, the server and router traffic is monitored to determine transfer times of files. This information is analyzed and stored in database 704. In one embodiment of the present invention, the database 704 would maintain a prioritized list of closest clients for a particular file. This database 704 information may then be accessed by a directory server to determine how to re-route and/or redirect traffic so as to effect the fastest peer-to-peer transfer between clients.

Thus, what has been described are embodiments of the present invention for use in such areas as file sharing, redirected data transfers, third party control of transfers, distributed backup and storage, and router table analysis.

The descriptions above have been kept simple to not obscure and yet illustrate the present invention. What now follows are more detailed possible embodiments of the present invention. Screen shots are used to illustrate possible features and capabilities of the present invention. However, it is to be understood that these are other embodiments of the present invention and that many others are possible.

Today's Intranet is rather one-dimensional enabling the transfer of information, text, files etc. Intel® Share and Learn Software (SLS) introduces the ability to significantly improve the capability and effectiveness of an Intranet by enabling much more efficient transport of video and rich media files by shifting the bottleneck for Video Intranet from the network to the computer. Note that, for purposes of illustrating this embodiment of the present invention, an intranet may be defined as: a computer network connecting an affiliated set of clients using standard internet protocols, such as, TCP/IP and HTTP; and/or: an IP-based network of nodes behind a firewall, or behind several firewalls connected by secure, possibly virtual, networks.

In traditional Intranet configurations, rich multimedia communications are streamed across the network to a desktop. The network is almost always the bottleneck as typically the file will have to be streamed across the network and as Wide Area Networking (WAN) is expensive there is typically not enough bandwidth to support more than just a couple of simultaneously streamed files. SLS allows moving compressed video, rich multimedia files, and large files rapidly to multiple desktop or mobile machines. SLS in effect creates a new protocol for sharing large files (such as, video, multimedia, etc) across the network or Intranet. SLS moves the bottleneck for video transfer across the Intranet from the network to the processor in a personal computer (PC).

One example is using SLS on a laptop to download video. The laptop when connected to a LAN may rapidly download a file from a local device connected to the LAN thus avoiding WAN transfers. This type of peer-to-peer transfer is preferable to WAN to LAN transfers because of the generally higher sustained transfer rates. SLS may increase performance for a number of different applications including Knowledge Management, Corporate Video Communications, eLearning, etc.

SLS has implications for Knowledge Management—one opportunity is that much codified knowledge exists in the form of presentations, text documents, etc. on individuals' PC hard drives. In traditional network environments this information and knowledge may not be available to others for sharing and reuse. SLS introduces a capability, which through a drop and share mechanism, this codified information may be shared with many others in a corporation. In one embodiment, by right clicking on the files and adding some meta data (either manually and/or in an automated fashion) a file may be made available to all others on the network. The file and relevant meta data is registered in a mediating directory server and other users may search this directory server based on several criteria including keywords, author etc. If a user wishes to retrieve the file, the file may be pulled from the originally publishing client, or else if it has been previously copied, from the nearest available client. Thus, much of the codified information and/or knowledge in an organization that may have previously been unavailable for use is now available through the registering of the file. This make the content available to users throughout the enterprise, creating an enterprise knowledge management system, which may save money and creating new opportunities through knowledge sharing and re-use. In yet another embodiment, the ability to index content and/or produce a corporate index of relevant knowledge/information may be enabled through SLS.

In a large company such as Intel it is often difficult to communicate to all employees simultaneously. Email can be delivered to all employees simultaneously but it is a relatively flat (not very rich) media. However, having the potential to have 80000 employees worldwide have access to video communications in a very short space of time may have potential for effecting better communication. Prior to the introduction of SLS, this would have been difficult as it would have been prohibitively expensive to provision the bandwidth and/or edge servers to allow streaming of video to 80,000 PC's. Now through SLS, little additional investment is necessary in infrastructure to allow this—video, rich multimedia or large files can be distributed from client to client using SLS's peer-to-peer file sharing protocol over existing networks and using hard drives on existing clients for storage. This capability delivered through SLS is another embodiment of the present invention.

eLearning may be considered similar to corporate communications, SLS allows near seamless transmission of large multimedia files across a corporation without the need for additional investment. As eLearning is an important new emerging application of technology, SLS and may change the economics and performance of eLearning.

Additionally, Other information may make use of SLS. SLS allows the substitution of one form of a computing resource for another, for example, in viewing a video file, a traditional mechanism for doing this is via streaming the file over a network to a client PC, one embodiment of the SLS mechanism is to copy a compressed video file over a local network giving near equivalent performance yet requiring a smaller network.

In one embodiment of the present invention, the Intel® Share and Learn Software (SLS), is a windows based application used for peer-to-peer file sharing. It consists of a client application written in a visual programming language and uses a database server component hosted on an SQL (Structured Query Language) server. The application is used to transfer files across the network in an enterprise environment. The SLS application uses a directory-mediated approach to determine the closest (or nearest) client containing the latest revision of the requested material; the material is then copied to the requesting machine.

Peer-to-peer in the most general sense is the sharing of resources between clients, where a client can range from a larger server to a handheld device. In the context of this document, it is defined as the ability to share content directly between clients, where clients may be servers, desktops, laptops, PDAs, (Personal Digital Assistants), handheld devices, or any other device capable of communicating with other devices.

In one embodiment SLS uses a directory mediated peer-to-peer file sharing approach. The directory consists of a database which tracks all transfers of files and is used to determine the nearest available client. The following flowcharts describe what occurs in one embodiment when a user launches SLS (FIG. 8A and FIG. 8B) and when a user selects a file (FIG. 9A and FIG. 9B).

The SLS Launch Flow proceeds as follows. As illustrated in Section 1 of FIG. 8A, the user launches SLS from a shortcut in the Start Menu. Next, a check is performed to see if the user is connected to the network. If the user is not connected to the network, the local database is read and the application opens in offline mode. If the user is connected to the network, a connection is made to the Intel® Share and Learn (SLS) website.

Figure 8A:
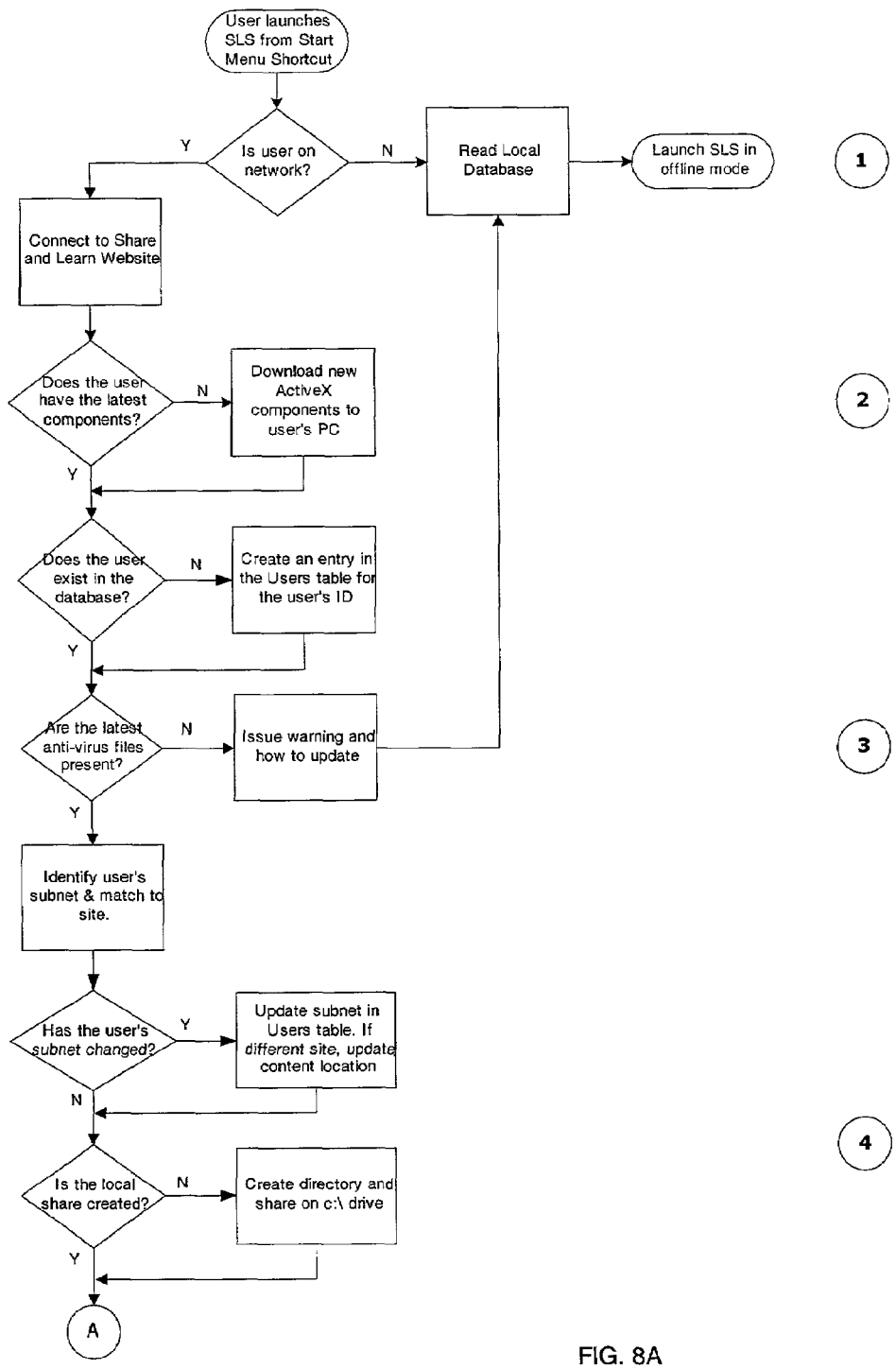
FIGS. 8A and 8B illustrate one embodiment of SLS launch flow.
Figure 9A:
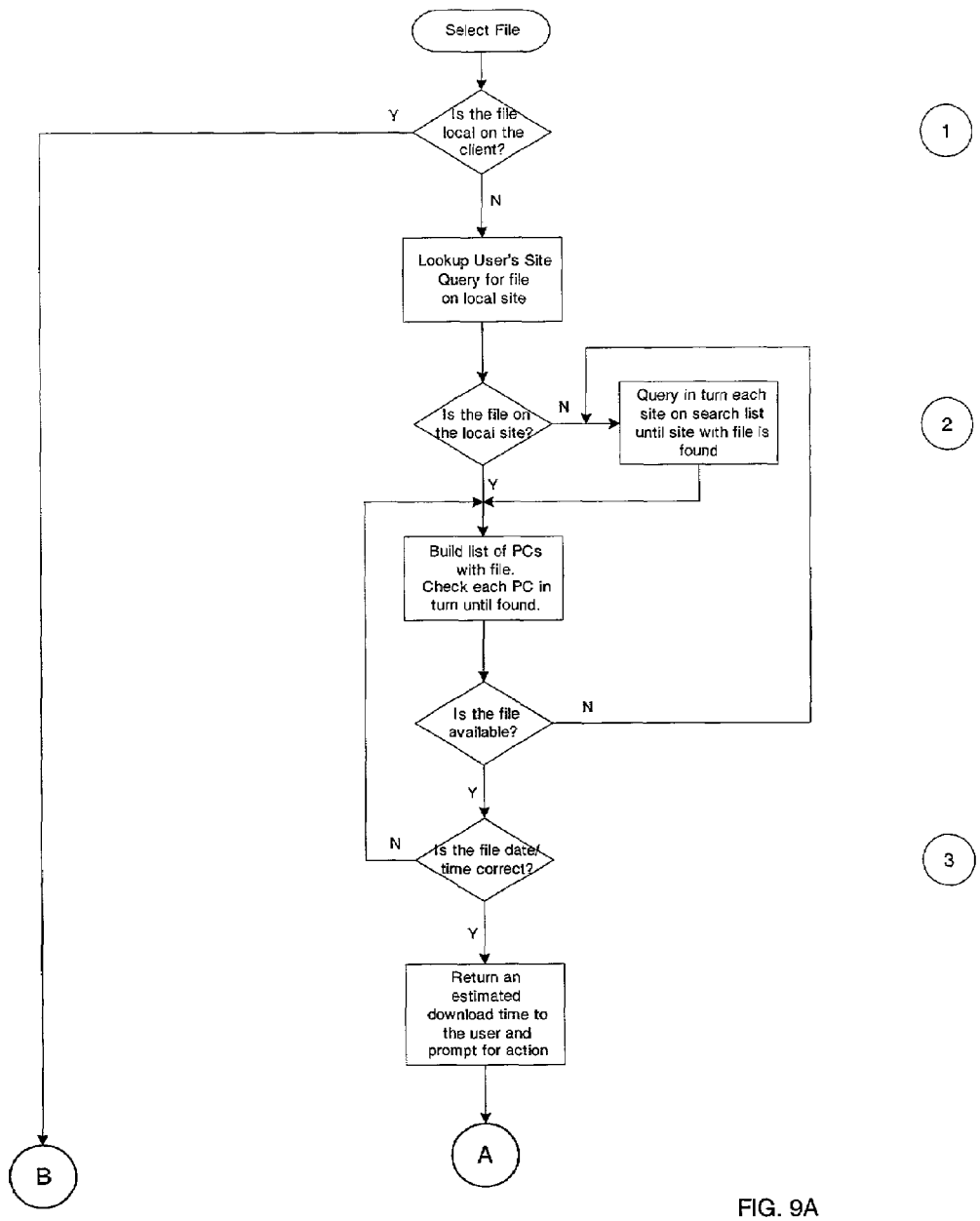
FIGS. 9A and 9B illustrate one embodiment of SLS file flow.
Figure 9B:
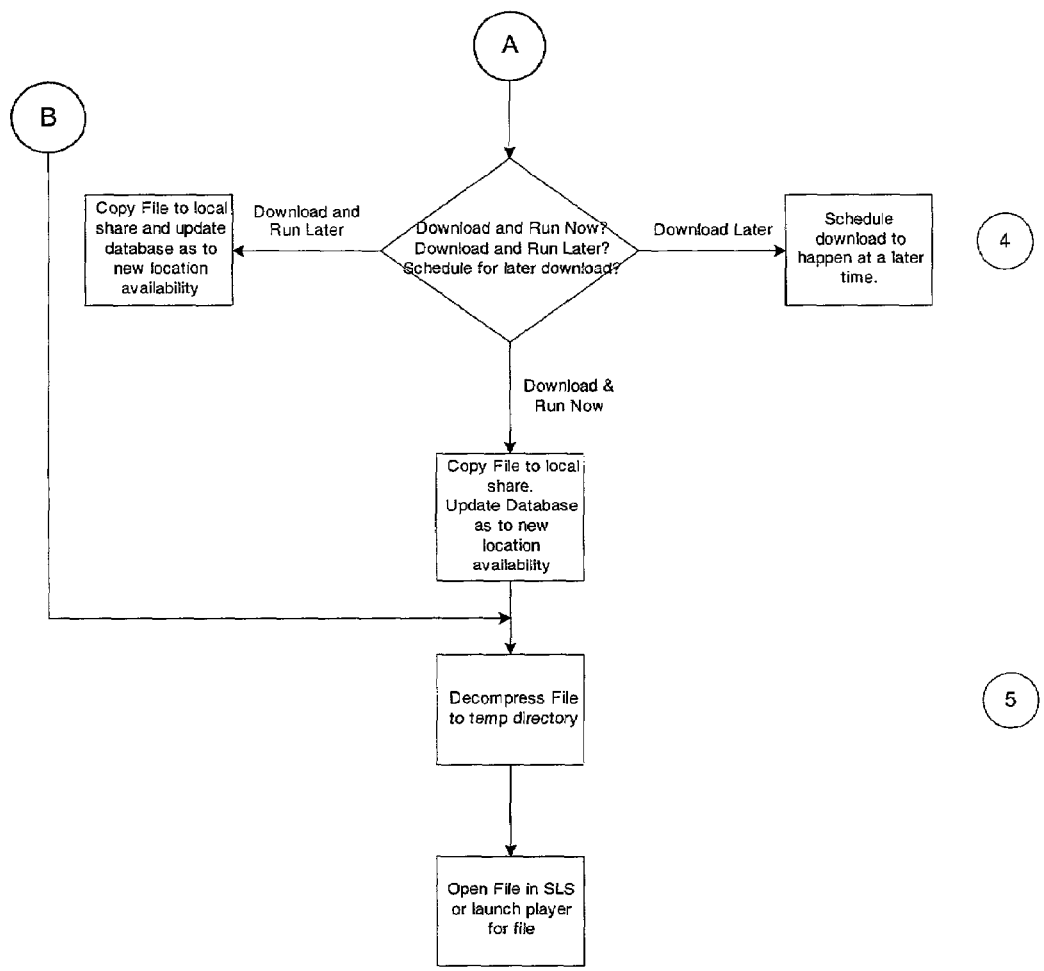

At Section 2 of FIG. 8A, upon connection to the Intel® Share and Learn (SLS) website, a check is performed to see if the user has the latest SLS software components. If the latest components are not present and/or need to be updated, they are downloaded from the site automatically. Next a check is made to see if the user exists in the database. If no entry exists for the user, then one is created using the user's ID.

At Section 3 of FIG. 8A, the application checks to see if the user is running the latest anti-virus software on their system. This is may be done by searching for a specific key in the registry. If the user does not have the latest anti-virus software, they are given a warning with details on how to upgrade the anti-virus files, and the application is forced into offline mode. This forcing into offline mode is done to prevent the transfer of files which may have become infected with a virus on the user's system. If the anti-virus files are up to date, the application continues in online mode. Next, a query is run to determine the subnet that the user is on. This network address is then compared to a master list on the database to determine which site the user is located at. If the user is located on a subnet which is not recognized by the system, it is flagged as a new subnet and added to the IPSubnets table in the database for later assignment to a site. If the user is present in the database, but their site information is different than that listed in the database, the record is updated and all content associated with this user is updated to be on this new site. This is done since users may be mobile and may move between sites. This check ensures that the content that the user has on their system is reflected as being present on their current site and not just their home site.

At Section 4 of FIG. 8A, a check is made to see if the local directory and share have been created on the user's PC. If the directory is not present, then a directory called SLSShare is created in the root of the c:\ drive. The SLSShare directory is shared on the network as slsshr$—this is to facilitate the local sharing of files which have been downloaded. If the directory is present, the application proceeds.

Figure 8B:
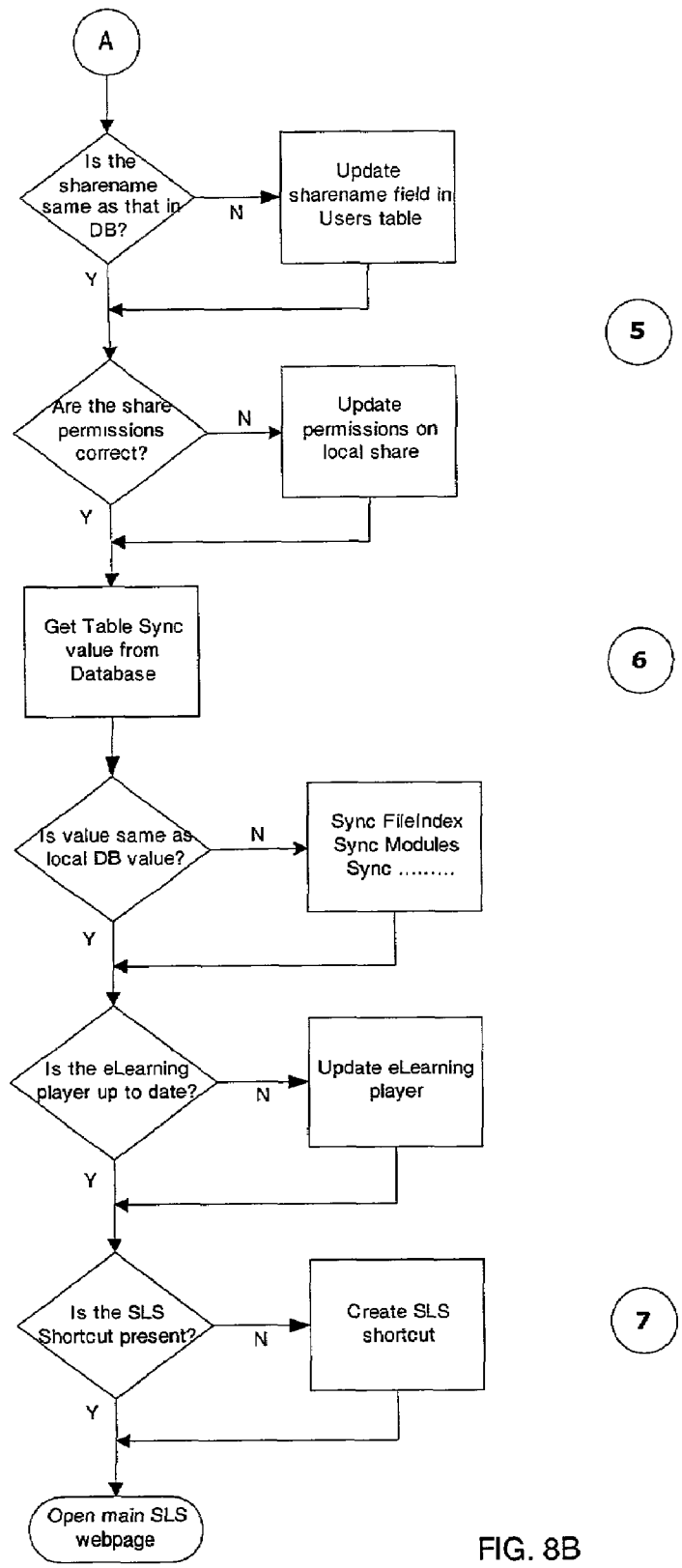

At Section 5 of FIG. 8B, the application checks to see if the user's PC name (and thereby the sharename) is the same as that which is stored in the database. If it needs to be updated, the information is entered in the Users table. To protect a user's PC from malicious attacks and virus outbreaks, appropriate permissions must be enabled on the share. This allows everyone to view the contents of the share but only the logged in user on the PC to add files. The application checks to ensure that these permissions are correctly set and if not, makes the appropriate changes.

At Section 6 of FIG. 8B, since it is possible to use Intel® Share and Learn in offline mode, a local database of XML files are maintained on each user's PC. These files contain information on the local files, test questions and other information and must be kept in synchronization with data in the production database. This is achieved by comparing a TableSync value in the database with that on the user's PC. If they are different, the appropriate files are updated. The eLearning player which allows content to be viewed offline, is then verified to be up-to-date, and if not, a newer version is downloaded.

At Section 7 of FIG. 8B, since SLS can be launched from the desktop, a shortcut is created in the users Start Menu, if a shortcut is not already present. Next, the main Intel® Share and Learn webpage is opened in the browser.

The SLS Select File Flow proceeds as follows. As illustrated in Section 1 of FIG. 9A, the user I selects a file from a Business Area. A check is performed to see if the user has already downloaded the file and if it is local on the PC. If the file is stored locally, a check is performed to ensure that the version is the latest revision. If the file is the latest version, it is decompressed to a temporary area and displayed using a player, or within SLS.

At Section 2 of FIG. 9A, if the file is not local, a query is issued to determine if there is an available copy of the file on the same site as the user. This information is obtained by looking up the site information from the Users table and querying against the FileIndex table. If the file is on the local site, a list of PCs which have the file is built up and is ordered by the PC which has been accessed the least number of times. This is done to balance the impact across the clients. Each PC on the list is queried in turn to see if a copy is still available on the system until a file is found. If no PCs on the user's site contains the file, the next site in the SearchSiteList table is queried. This continues until the file is found. The SearchSiteList is built up for each Intel® site. It is designed based on network configuration and lists the sites to query for a file based on the available bandwidth between the site issuing the query and, in this particular embodiment up to ten other sites around the globe.

At Section 3 of FIG. 9A, once a copy of the file is found, it is queried to ensure that it is the latest revision and that it has the correct date/time stamp and file size. If it is not correct, the search continues. If the file is the correct revision, an estimated download time is returned to the user. This value is obtained by averaging the previous download times from the site containing the file to the users own site.

At Section 4 of FIG. 9B, the user is then given three options to choose from: 1) Download and Run Now; 2) Download and Run Later, and; 3) Schedule the download for later. If the user chooses to schedule the download for later, an entry is put in the TransferSchedule Table listing the time for the transfer to take place. When the time arrives and provided the user still has SLS running on their system, the file is copied to the SLSShare directory on the users PC from the nearest client and the database is updated as to the presence of a new copy of the file. If the user chooses to download the file but to run it later, the file is copied to the SLSShare directory and the user is notified that the download has completed. The database is updated as to the presence of a new copy of the file.

At Section 5 of FIG. 9B, if the user chooses to download the file and run it immediately, the file is copied to the SLSShare directory, and the database is updated as to the presence of a new copy of the file. The file is then decompressed to the SLSTemp directory and opened either in SLS or in a separate player depending on the content. If at any stage an interruption occurs in copying the file, the copy is resumed by finding the next nearest source and resuming the copy from there. This may happen, for example, if the source for the file is a laptop and the laptop is removed from the network while a copy is in progress.

One of ordinary skill in the art will appreciate that many alternative embodiments of the present invention are possible using a variety of techniques. Some such techniques, but by no means limited to these alone, are client locator, publishing, logical drive, purging content, controlling flow, parallel copies, third party control, router analysis, network database. These are briefly described below, and some of these have been described above as well.

Client Locator using Ping was discussed above. This method used the windows Ping function to get an estimated transfer time between the requesting client and a remote machine. One implementation may use the ping between the requesting client and every other machine that has a copy of the file. This may be done by issuing the ping command in sequence to every other machine and then choosing the lowest value for transfer. Another approach may use the ping transfer time between subnets. Once a value is established between two subnets, it may be entered into the SubnetTransferInfo table for future reference. Yet another approach is to ping for site level transfers. This approach may be used, for example, in FIG. 9A Section 2 of the Select File Flow.

Generic Publishing would allow any user to publish content into the peer-to-peer system. This could be done by allowing them to right-click on any file and select to add it to SLS. Essentially each PC would be used as a peer-to-peer server, with a shared directory providing the distribution platform from the PC.

Logical Drives would take the shared folders from a number of PCs and use them to form a logical drive made up of an array of disks. This may be linked with a methodology such as RAID (Redundant Array of Inexpensive Disks) to allow for any content stored across this drive, to be restored when a certain number of the disks (but not necessarily all) are online. This could be used for backing up data to client PCs and restoring as necessary.

Purging of content in the Peer-to-Peer System relates to the ability to remove distributed copies of a file from the systems the files were distributed to. This may be tied into the expiry date of a file, which may be set by the author, or the necessity to recall a file which had already been distributed. One method of doing this may be by using a domain administrator's account to automatically connect to each PC and purge the relevant content. Another way of doing this would be to have an agent program running on each PC which would listen for requests from the system. On receiving a request to delete a file, it would remove the file from the local directory on the user's PC.

Controlled Flow of Content refers to the ability of restricting the flow of content into particular sites so as not to impact the overall network capacity. By analyzing the network topology, it may be seen what the total bandwidth into a particular site is. A restriction may then be placed on the transfer of data which would only allow SLS to consume a percentage of available bandwidth. This may be used, for example, in FIG. 9B Section 4 of the Select File Flow.

Parallel Copy is where a file may be split into chunks of data by the application and each chunk may be copied from a different machine which is making the file available. This type of parallel copy may improve the overall speed of download to the requesting client and may also lessen the impact seen to the client which is sharing the file, as a lesser amount of data is being taken from it. This may be used, for example, in FIG. 9B Section 4 of the Select File Flow.

Third-party control of File Transfer uses an intermediary client to control the transfer of data to another device. For example, client A requests content from client B. However client A is a handheld device and is not always on the network. Client B is located across the WAN from client A. At this point client C is requested by client A to download and store the content until client A comes back on the network.

Router Table Analysis may allow SLS to query the network routers directly in order to determine the nearest copy of a file. Since the router tables are dynamic, any information obtained from them would be more accurate at a point in time than a static network topology set-up. This may improve the overall speed of transferring files as it would take into account any significant network activity which was taking place at that time. This may be used, for example, in FIG. 9A Section 2 of the Select File Flow.

Dynamic Network Database may involve the creation of a stand-alone database which would give a dynamic status as to the latencies in the network at any point in time. The database would be constantly updated by network monitors and would look for patterns in network traffic. The database would then be used to determine the optimum path and closest client for file-transfers. This would be used, for example, in FIG. 9A Section 2 of the Select File Flow.

Figure 10A:
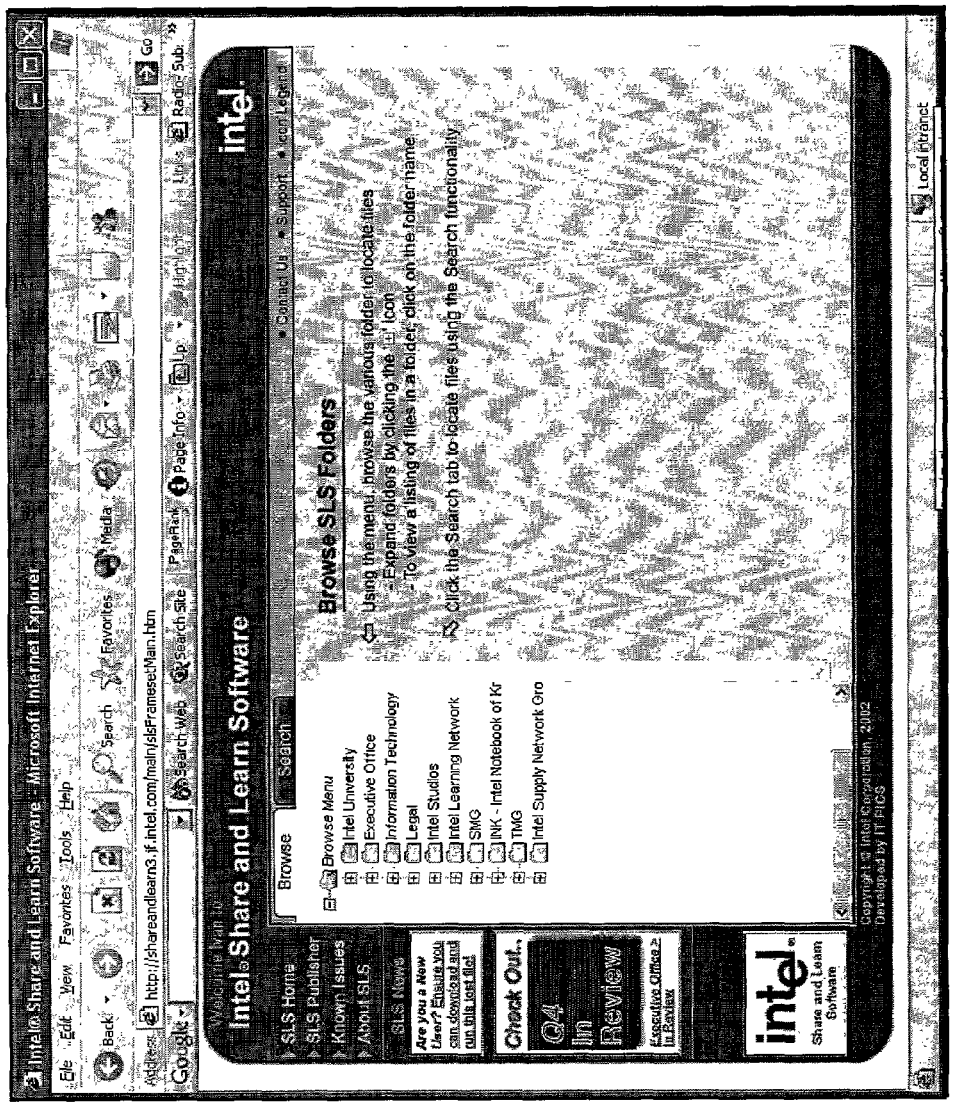
FIGS. 10A through 10H illustrate possible user interfaces of the present invention.
Figure 10B:
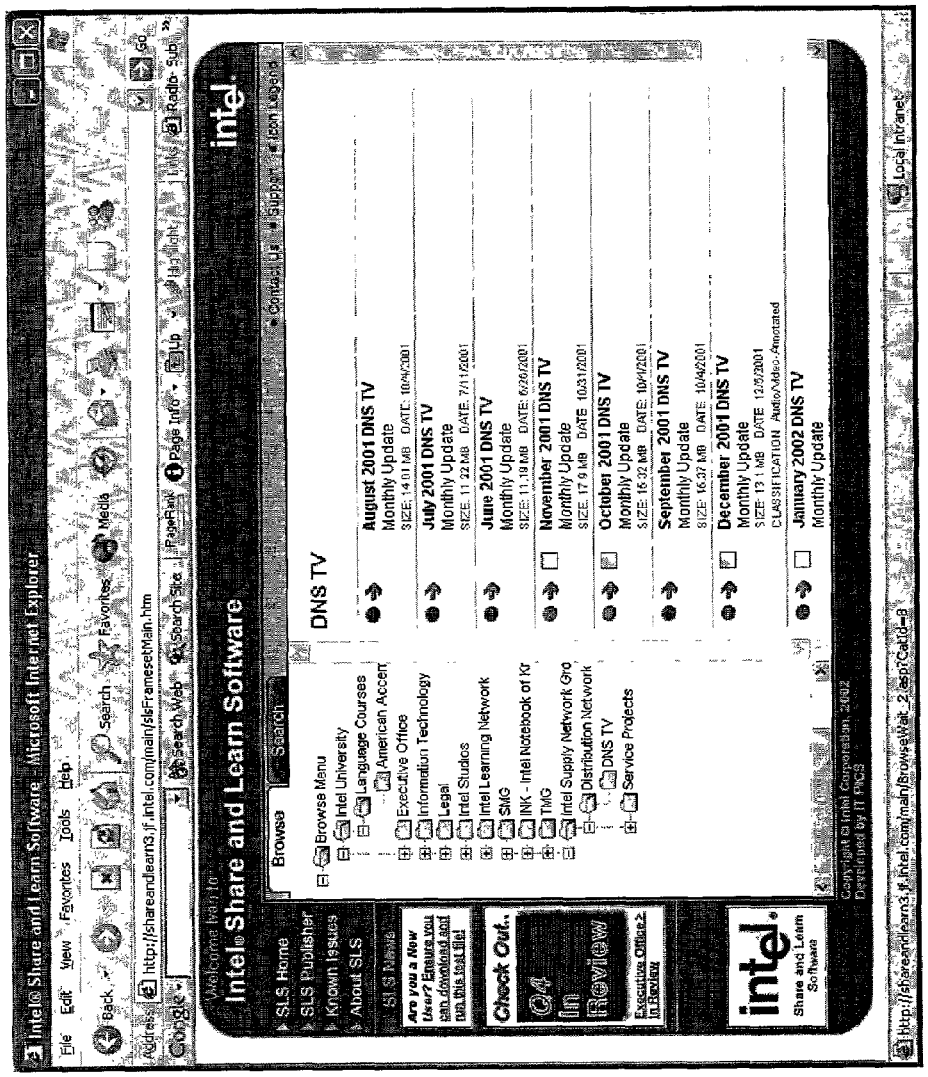
Figure 10C:
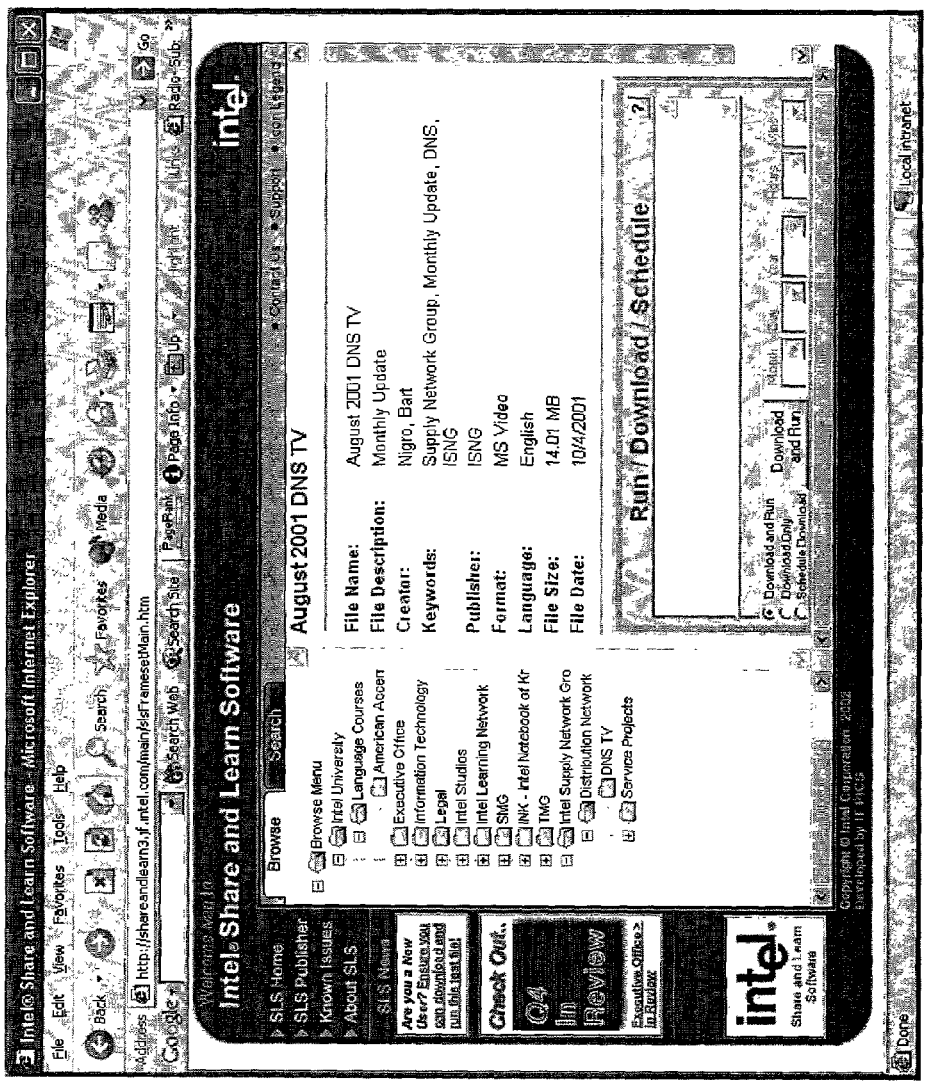
Figure 10D:
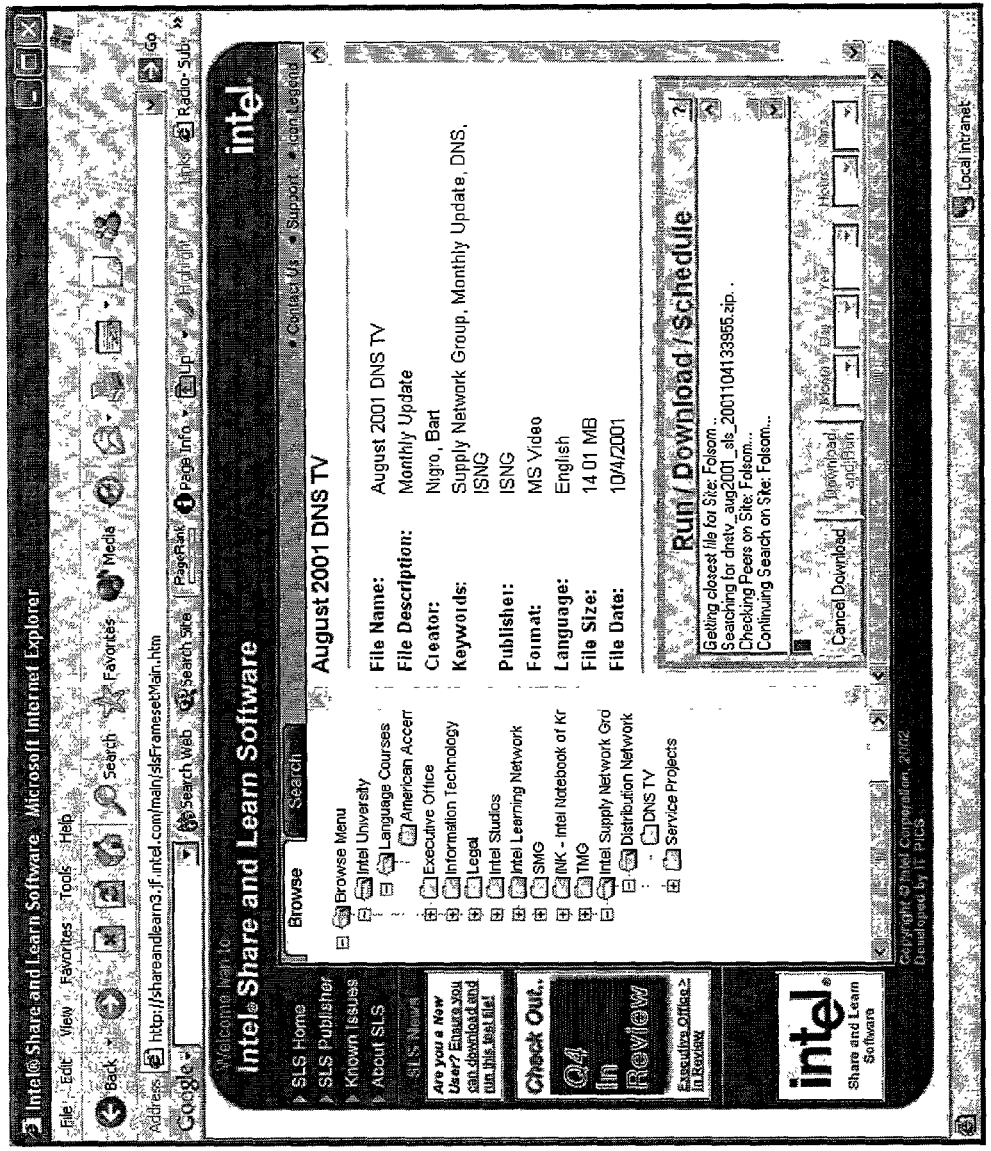
Figure 10E:
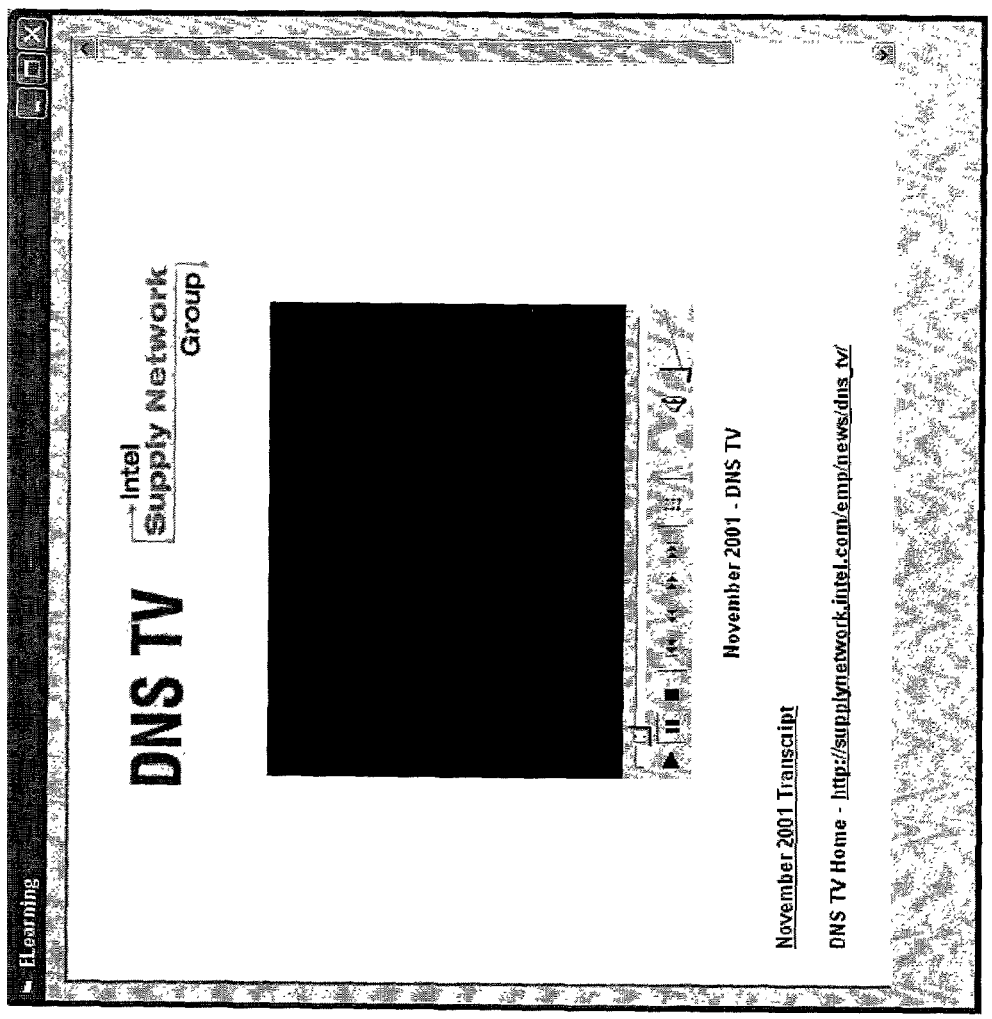
Figure 10F:
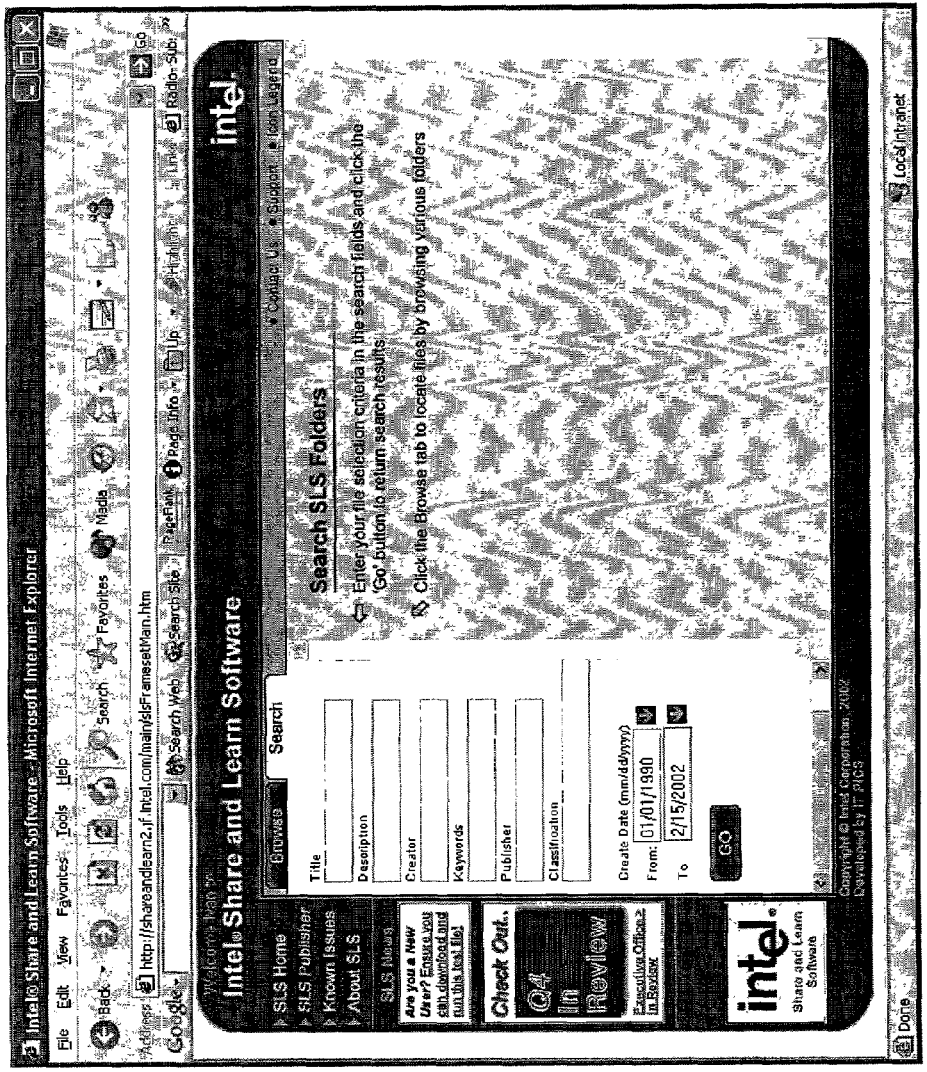
Figure 10G:
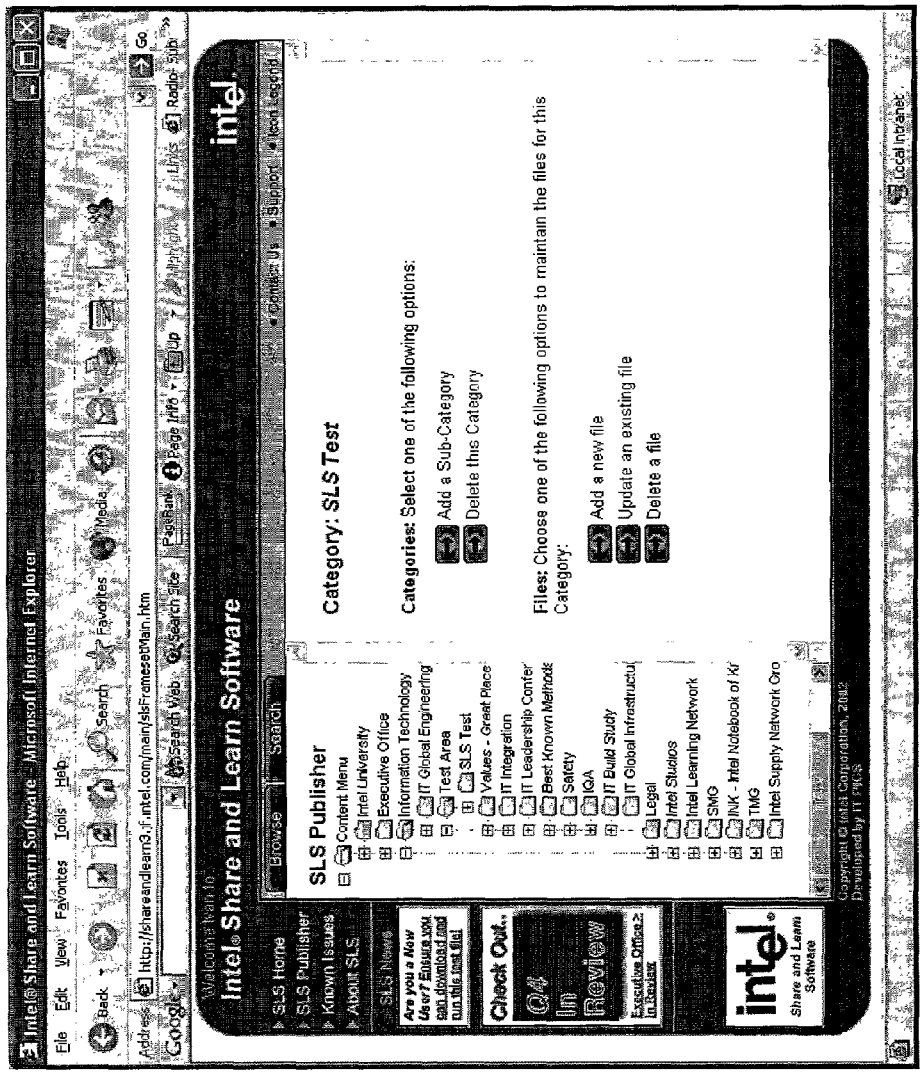
Figure 10H:
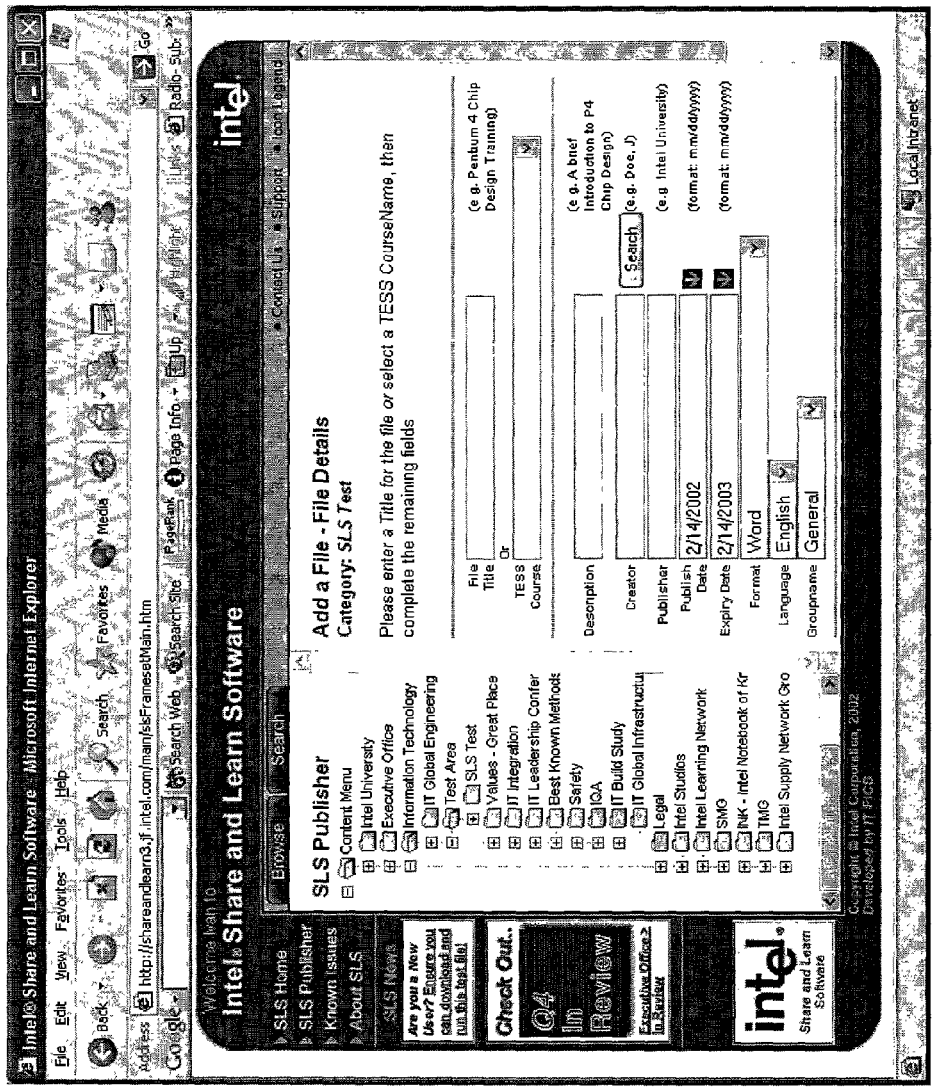

Examples of possible embodiments of the present invention user interface are illustrated in FIGS. 10A through 10H. FIG. 10A illustrates an initial view of SLS at startup. FIG. 10B illustrates a view of SLS after browsing to a category. FIG. 10C illustrates a view of SLS after selecting a file for download. FIG. 10D illustrates a view of SLS during a file download. FIG. 10E illustrates a file opened in n SLS viewer. FIG. 10F illustrates a view of SLS during a file search. FIG. 10G illustrates a view of SLS Publisher showing a menu to add, update, or delete content. FIG. 10H illustrates a view of SLS while adding new content.

Yet another embodiment of the present invention may be used redirect data transfer in a peer-to-peer network environment. In a peer-to-peer network, data is transferred between clients instead of from a server to a client. To gain the most efficient transfer of data, files should be copied from the nearest available client that has the information which is being requested. In general, peer-to-peer applications use their own interface to manage and control content distribution. By implementing a client-based web proxy, it may be possible to bring the speed of peer-to-peer transfers to any website which had been catalogued by a peer-to-peer service, without necessitating the user to changing their user interface.

In one embodiment, a peer-to-peer file database may be established to track the transfer of files from particular websites. If a website provider wanted to make use of this service they would run an application which would catalogue and index all files available from their site, uniquely identify them, and record a reference to them in the peer-to-peer database. Any subsequent transfers of these files would be tracked by the proxy service. A client based web proxy would reside on the client PC and run as a service. The proxy service would intercept all HTTP requests from the client and enable communication between the client and the peer-to-peer file database. When the user requests a file over HTTP, the proxy service would query the peer-to-peer database to see if it was tracking the location of this file. If the file was not being tracked, the request would proceed to the web server as per normal, and nothing unusual would happen. However, if the file was one of those being tracked by the system, the proxy service would query the peer-to-peer database for the nearest location of this file (usually on another user's PC) and retrieve the file directly from there, preferably on its own local network. This may have the benefit of reducing the download time for the user (if the file is greater than a certain size), and for the IT department by reducing the utilization on its Wide Area Network.

Figure 11:
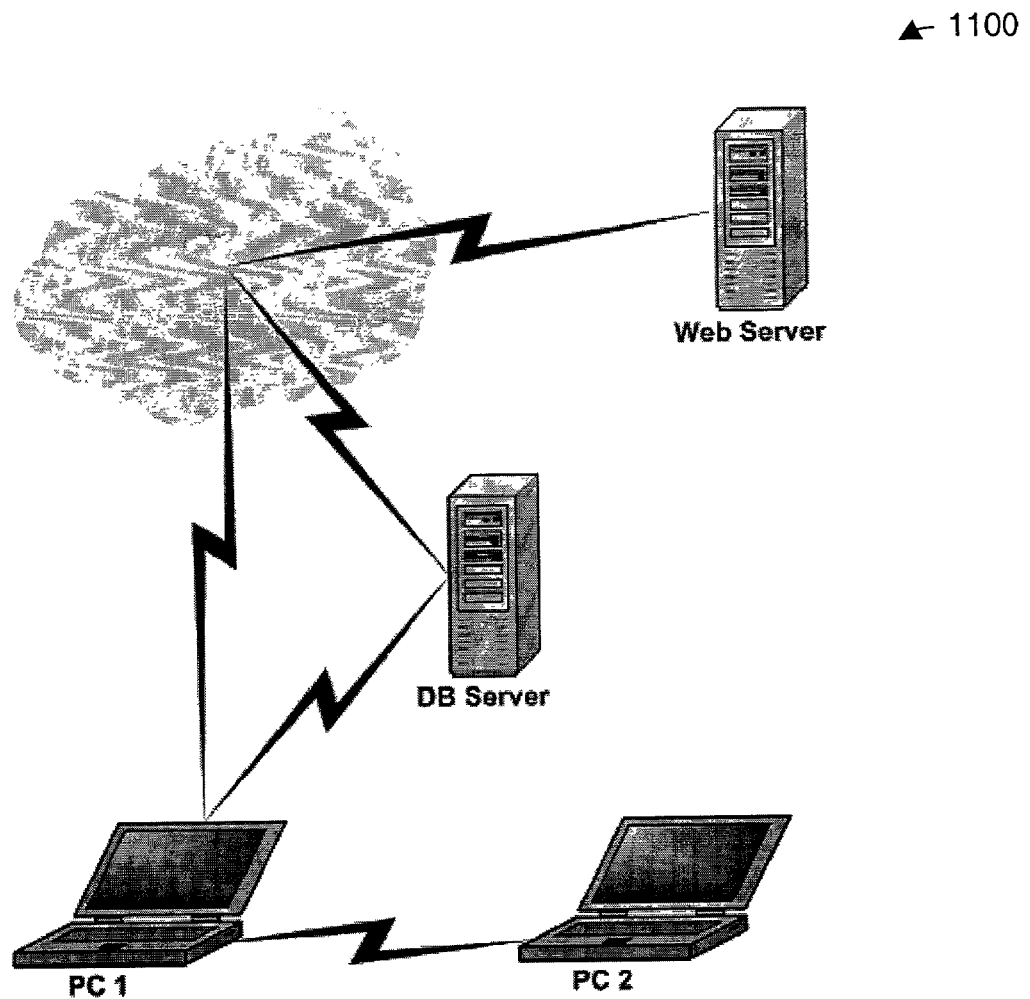
FIG. 11 illustrates one embodiment of the present invention a for a peer-to-peer proxy.

Such an embodiment is illustrated in FIG. 11 where PC 1 may request a file from a webserver located on the Internet or Intranet. The request would be intercepted by a proxy service running on the client. The proxy would query the database, to see if the website being accessed was one that was being tracked by the peer-to-peer database. If the site is one which is being tracked by the peer-to-peer database, the system will check to see if the file is available locally. If the file is available locally, the information as to the local sources for the file will be returned to the requesting client (e.g. PC 2), and a direct file copy between the peers can be initiated from there. After this transfer, the peer-to-peer database will be updated to reflect that a new location for the file is available. If a copy of the file is not available locally, a standard request will be sent to the webserver hosting the file and a copy of it will be downloaded to the requesting client. As in the previous case, an update will be sent by the proxy service to the database, indicating that the file is now available locally, and making it available for future requests. If the web site is not being tracked by the system, the proxy service will pass on the request to the webserver in the normal fashion with no impact to the user.

Figure 12:
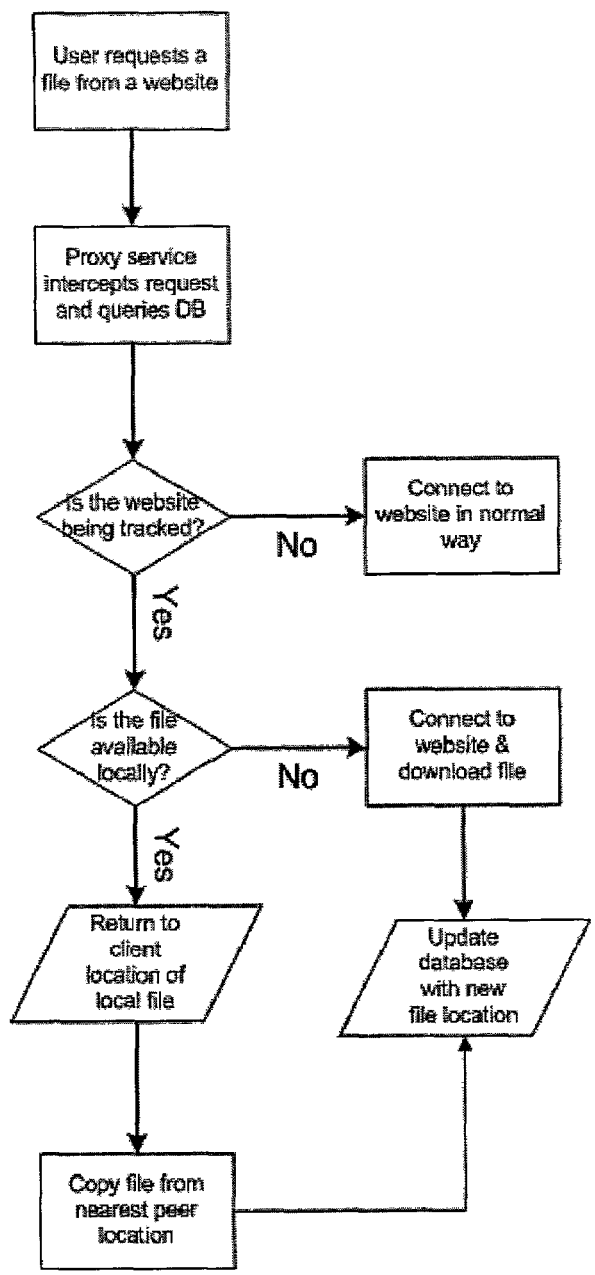
FIG. 12 is a flow chart of one embodiment of the present invention as a peer-to-peer proxy.

FIG. 12 illustrates a flow chart of one embodiment of the present invention. A proxy service would be deployed on client PCs which would intercept all HTTP requests between an Internet browser and any website. The proxy would query a peer-to-peer database to see if the website being requested was being tracked by the peer-to-peer system. If the site was being tracked, a list of locally available copies of the file would be returned to the client via the proxy service and a direct copy of the file from its nearest available peer would be initiated. This has the benefit of reducing the download time for the user for large files across the WAN and the Internet. Once the file has been copied, the database would be updated with a new location for the file. If the file is not available locally, it can be downloaded in the normal fashion from the target website, and once more upon completion, the database server would be updated to reflect a new location of the file on the local network. If the website was not being tracked, the request travels straight through the proxy and data is transferred without any intervention.

The proxy service acts as an intermediary for all traffic being requested over HTTP by the user. It queries the peer-to-peer tracking database for specific filenames and URLs. If filenames are found in the database, the request for the file is essentially redirected to the local copy. This reduces the download time for the user and minimizes the impact to available bandwidth.

From a practical implementation standpoint, for the system to be effective, a number of conditions may have to be applied at the proxy level. A minimum size may have to be specified for the file being downloaded. If the file is below a certain size, it may take longer to query the database and retrieve the file locally than it would to get the file directly. Another condition may be on the types of files available in this fashion. Also, an expiry time on the content may be applied to ensure that the user retrieves a new version of the file being requested if one is available.

In yet another embodiment of the present invention, a client which is intermittently connected to a network (e.g. a handheld PC) can select a file for download from a remote location (slow WAN connection) using a peer-to-peer application. The user may then request that the file be downloaded to another client which is permanently connected to the network, e.g. a desktop PC, at a location near the handheld PC (fast LAN connection). The next time they connect they can download the file from the nearby client over the fast connection in a fraction of the time. This service may be controlled by a directory server and a peer-to-peer application or an agent which may be installed on PCs and the handheld devices.

Figure 13:
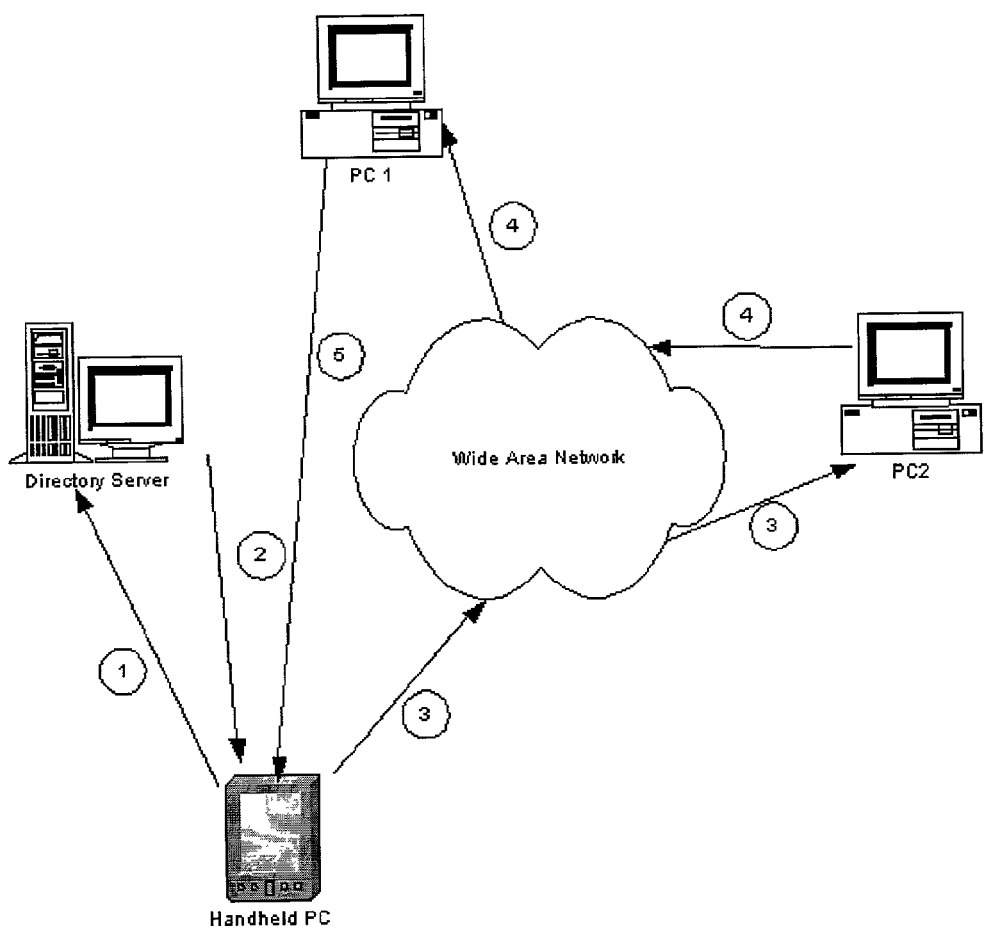
FIG. 13 illustrates one embodiment of the present invention where a third party is controlling a file transfer.

FIG. 13 illustrates one such embodiment of the present invention. The handheld PC selects a file using a peer-to-peer application and queries a directory server for its location (communication 1). The directory server answers the request with the file being located on PC2 (communication 2). Since PC2 is across a Wide Area Network, it may take a long time to download the file, so the handheld may PC request that the file be copied to PC1 (communication 3), thereby allowing the handheld PC to disconnect from the network. PC2 then copies the file to PC1 over the Wide Area Network (communication 4). When the handheld PC rejoins the network, the file can be copied quickly from PC1 (communication 5).

In another embodiment of the present invention, it may be used for distributed backup and storage using peer-to-peer technology. This involves the usage of a portion of disk space from a number of computers on a network and using them to form a logical or virtual drive made up of an array of disks. This may also be linked with a methodology such as RAID (Redundant Array of Inexpensive Disks) to allow for any content stored across this drive to be restored when a certain number of the disks (but not necessarily all) are online. This may be used for backing up data to client PCs and restoring as necessary. Another approach would be to backup a complete dataset to a statistically sound number of PCs ensuring that files may be restored a certain high percentage of the time.

A portion of users' hard disk space would be reserved by an administrator for this purpose and it may or may not be visible to the user on that PC. In addition, all data stored may be encrypted to maintain the security and privacy of the owner's data. The backing up of files may be mediated by a server. This server would track available clients and the location of files that have been backed up, in addition to controlling the security of the system.

Figure 14:
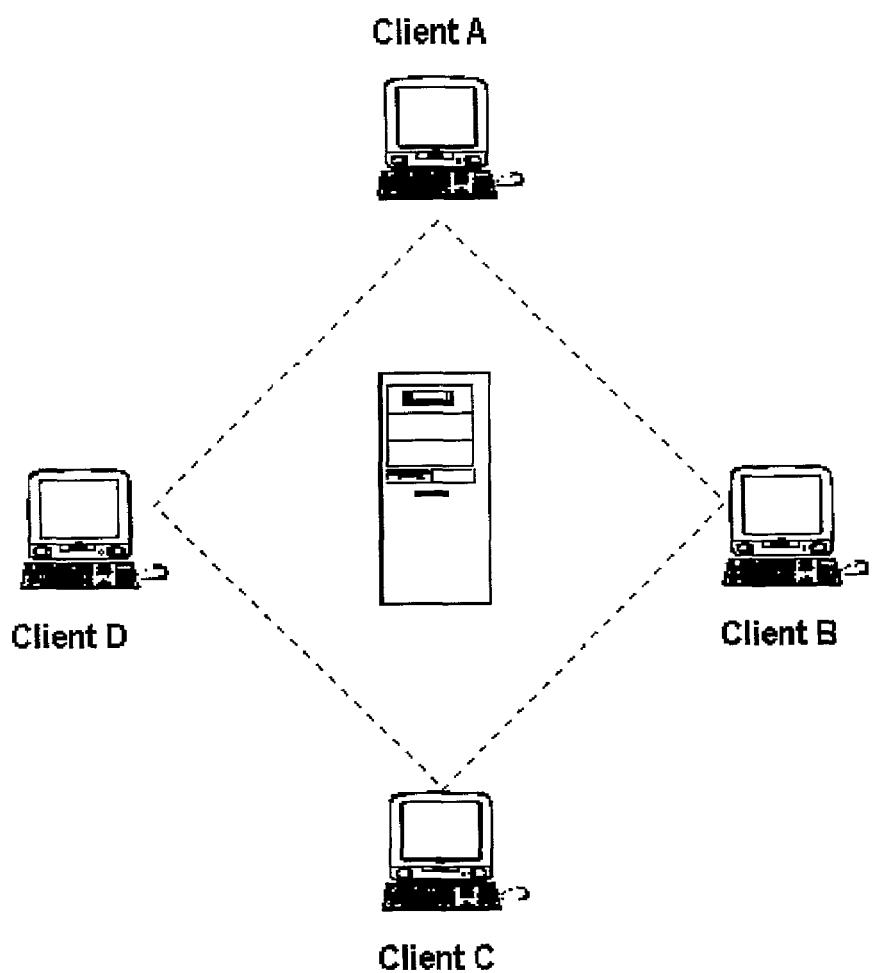
FIG. 14 illustrates one embodiment of the present invention for backup storage.

FIG. 14 illustrates one such embodiment of the present invention. Client A could decide to backup a number of files. Instead of going to a fileserver, an agent application on client A's PC would query the server in the peer-to-peer network. This server would identify a number of other PCs to backup the data to—in this example, Clients B, C & D. One of two things would then happen—either the complete files would be copied in turn to Clients B, C & D or parts of the files may be copied to Clients B, C & D using, for example, a RAID algorithm.

In yet another embodiment of the present invention, an agent program may be deployed on a client PC which would monitor the user's files which have changed. The, at a predefined interval this agent would connect to the central control server to determine what peer PCs the files should be backed-up to. Once determined, the agent may initiate a file copy to each of the identified peers, either carrying out a complete copy of the files to each of the peers or a copy determined by a RAID algorithm, etc. In addition, only the parts of the files that have changed or new files added to the system may get backed up. To restore files, the agent may once again connect to the central control server to determine the location of the files to be restored and initiate the transfer back.

In another embodiment of the present invention the present invention may be used to speed up peer-to-peer transfers. In a peer-to-peer network, data is transferred between clients instead of from a server to a client. At present, many peer-to-peer applications operate by using predefined routes across a network to transfer date from one place to the other. Theoretically this method will result in the fastest download times for the user; however it does not take into account delays which may be caused by network congestion or outages. By implementing a system of collecting information from routers, the paths through a network are more dynamic and up-to-date. A peer-to-peer software application would be able to leverage this information if it was stored in a manner which was readily accessible to it, such as a database. When a user would select a file for download, the peer-to-peer application would query the database in its normal manner for the available copies of a file. In addition, it would now query a database for the best paths to these files, ruling out ones which were inaccessible, due to outages and congestion for example, and ordering the list of available copies in terms of shortest download times. This reduces the time to access content for the user and also minimizes the impact on various segments of the network.

To gain the most efficient transfer of data, files should be copied from the nearest available client that has the information which is being requested. While a peer-to-peer system may know the location of the nearest available client, this machine is not always necessarily the one from where the fastest data transfer may occur. This may be due to network congestion or other problems on the network. In general, a network router will be aware of impacts like this on the network and route general data transfers using a more appropriate path. This information is stored in router tables and is updated frequently through broadcasts that are sent around the network.

An embodiment of the present invention in the form of a software application may run on a server and proactively listen on the network for update broadcasts between network routers. The application would interpret these broadcasts and store the information in tables located on a network accessible database. This information may then be obtained and used by a peer-to-peer application by issuing a query to the database to determine the most appropriate path to begin copying information from.

Figure 15:
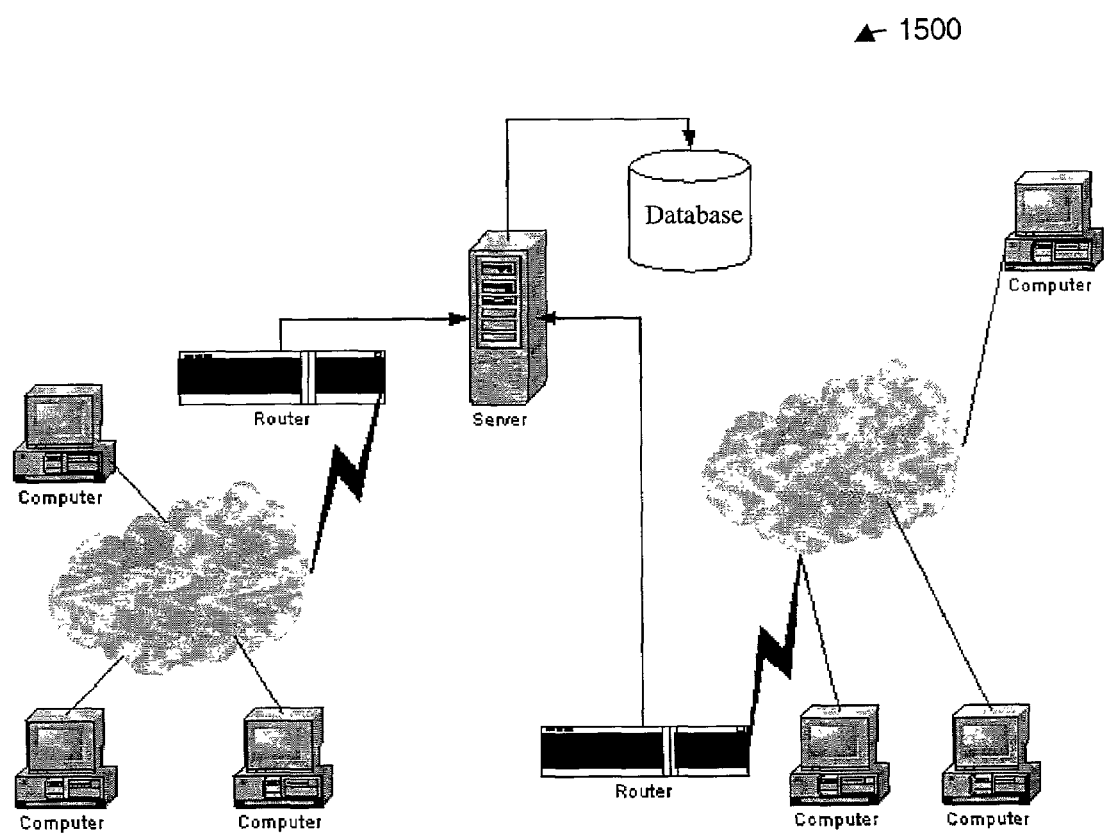
FIG. 15 illustrates one embodiment of the present invention for router table analysis.

FIG. 15 illustrates one such embodiment of the present invention. The server would listen on the network for update broadcasts between, in this example, the two routers, to get information on the most appropriate paths through the system. This information is analyzed and interpreted by the application and uploaded to the database where it is available for interrogation by a peer-to-peer application. The peer-to-peer application may be running on any of the computers shown in FIG. 15. During operation the application would query its database for the nearest copy of a file and then query the router information stored in the database for the best path to the data sources. Using these two points of reference, an ordered list of content, which will be the fastest to retrieve, would be returned to the application thus minimizing the impact on the network and delivering the file as quickly as possible to the user. Since the routers are continually being updated, the most appropriate path to take through the network will be known from listening to the broadcasts.

In another embodiment, a software application would be deployed on a server which would listen to broadcasts on the network between the routers deployed on it as well as network traffic. The information gathered would give details on the best path to take if someone was copying information, from one client to another on a different part of the network. The application would interpret the broadcasts and traffic, and this information would be stored in database tables which may be interrogated by a software application. The information in the database would be updated by the software listening to further broadcasts and traffic, and inserting the data when appropriate, ensuring that it was current and up to date.

Thus, various other embodiments of the present invention have been described.

Referring back to FIG. 1, FIG. 1 illustrates a network environment 100 in which the techniques described may be applied. The network environment 100 has a network 102 that connects S servers 104-1 through 104-S, and C clients 108-1 through 108-C. As shown, several computer systems in the form of S servers 104-1 through 104-S and C clients 108-1 through 108-C are connected to each other via a network 102, which may be, for example, a corporate based network. Note that alternatively the network 102 might be or include one or more of: the Internet, a Local Area Network (LAN), Wide Area Network (WAN), wireless network, satellite link, fiber network, cable network, or a combination of these and/or others. The servers may represent, for example, disk storage systems alone or storage and computing resources. Likewise, the clients may have computing, storage, and viewing capabilities. The method and apparatus described herein may be applied to essentially any type of communicating means or device whether local or remote, such as a LAN, a WAN, a system bus, etc.

Referring back to FIG. 2, FIG. 2 illustrates a computer system 200 in block diagram form, which may be representative of any of the clients and/or servers shown in FIG. 1. The block diagram is a high level conceptual representation and may be implemented in a variety of ways and by various architectures. Bus system 202 interconnects a Central Processing Unit (CPU) 204, Read Only Memory (ROM) 206, Random Access Memory (RAM) 208, storage 210, display 220, audio, 222, keyboard 224, pointer 226, miscellaneous input/output (I/O) devices 228, and communications 230. The bus system 202 may be for example, one or more of such buses as a system bus, Peripheral Component Interconnect (PCI), Advanced Graphics Port (AGP), Small Computer System Interface (SCSI), Institute of Electrical and Electronics Engineers (IEEE) standard number 1394 (FireWire), Universal Serial Bus (USB), etc. The CPU 204 may be a single, multiple, or even a distributed computing resource. Storage 210, may be Compact Disc (CD), Digital Versatile Disk (DVD), hard disks (HD), optical disks, tape, flash, memory sticks, video recorders, etc. Display 220 might be, for example, a Cathode Ray Tube (CRT), Liquid Crystal Display (LCD), a projection system, Television (TV), etc. Note that depending upon the actual implementation of a computer system, the computer system may include some, all, more, or a rearrangement of components in the block diagram. For example, a thin client might consist of a wireless hand held device that lacks, for example, a traditional keyboard. Thus, many variations on the system of FIG. 2 are possible.

For purposes of discussing and understanding the invention, it is to be understood that various terms are used by those knowledgeable in the art to describe techniques and approaches. Furthermore, in the description, for purposes of explanation, numerous specific details are set forth in order to provide a thorough understanding of the present invention. It will be evident, however, to one of ordinary skill in the art that the present invention may be practiced without these specific details. In some instances, well-known structures and devices are shown in block diagram form, rather than in detail, in order to avoid obscuring the present invention. These embodiments are described in sufficient detail to enable those of ordinary skill in the art to practice the invention, and it is to be understood that other embodiments may be utilized and that logical, mechanical, electrical, and other changes may be made without departing from the scope of the present invention.

Some portions of the description may be presented in terms of algorithms and symbolic representations of operations on, for example, data bits within a computer memory. These algorithmic descriptions and representations are the means used by those of ordinary skill in the data processing arts to most effectively convey the substance of their work to others of ordinary skill in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, can refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention can be implemented by an apparatus for performing the operations herein. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, hard disks, optical disks, compact disk-read only memories (CD-ROMs), and magnetic-optical disks, read-only memories (ROMs), random access memories (RAMs), electrically programmable read-only memories (EPROM)s, electrically erasable programmable read-only memories (EEPROMs), FLASH memories, magnetic or optical cards, etc., or any type of media suitable for storing electronic instructions either local to the computer or remote to the computer.

The algorithms and displays presented herein are not inherently related to any particular computer or other apparatus. Various general purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor, or by any combination of hardware and software. One of ordinary skill in the art will immediately appreciate that the invention can be practiced with computer system configurations other than those described, including hand-held devices, multiprocessor systems, microprocessor-based or programmable consumer electronics, digital signal processing (DSP) devices, set top boxes, network PCs, minicomputers, mainframe computers, and the like. The invention can also be practiced in distributed computing environments where tasks are performed by remote processing devices that are linked through a communications network.

The methods of the invention may be implemented using computer software. If written in a programming language conforming to a recognized standard, sequences of instructions designed to implement the methods can be compiled for execution on a variety of hardware platforms and for interface to a variety of operating systems. It will be appreciated that a variety of programming languages may be used to implement the teachings of the invention as described herein. Furthermore, it is common in the art to speak of software, in one form or another (e.g., program, procedure, application, driver, . . . ), as taking an action or causing a result. Such expressions are merely a shorthand way of saying that execution of the software by a computer causes the processor of the computer to perform an action or produce a result.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression. Thus, one of ordinary skill in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a computer system in which the techniques of the present invention may be practiced as well as implemented as an embodiment).

A machine-readable medium is understood to include any mechanism for storing or transmitting information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

Reference has been made to LAN (Local Area Network) and WAN (Wide Area Network). What is to be understood, as is understood by those of ordinary skill in the art, is that LAN and WAN are relative terms. For example, the Internet may be considered a WAN with respect to a large corporate network, and the large corporate network may be considered a WAN with respect to a department network within the large corporation network. Likewise, the small department network may be considered a LAN with respect to a large corporate network, and the large corporate network may be considered a LAN when compared to the Internet. As such, what one is to appreciate, is that where discussions have related LANs to WANs, they are relating smaller networks to larger networks, and that this comparison is not fixed as to where the comparison takes place. Thus, one network may appear as a WAN to a smaller network, and yet to another network appear as a LAN. What is to be appreciated is that in the art, the words sometimes have meanings commensurate with the surrounding environment, and yet often the words are used interchangeably without respect to the specific structure or environment, i.e. one of ordinary skill in the art understands the use and meaning.

Thus, a method and apparatus for peer-to-peer services have been described.

What is claimed is:

1. A method comprising:
   maintaining a directory at a server, the directory having a list of a plurality of devices, the directory further having a prioritized list of the plurality of devices having files;
   receiving a request at the server from a first device for a file, the first device of the plurality of device, the first device including a client coupled with the server;
   seeking a second device having the requested file by referencing the prioritized list of the plurality of devices, the second device being closest in proximity to the first device, the requested file having a first version, wherein the seeking of the second device is performed by the server;
   communicating a location of the second device to the first device via the server;
   directing the first device to directly obtain the requested file from the second device, wherein the directing of the first device is performed by the server;
   transferring the requested file from the second device to the first device via the server; and
   updating the requested file from the first version to a second version via the server, wherein the second version being newer than the first version and residing at a third device of the plurality of devices, the server redirecting the first device to directly obtain the second version of the requested file from the third device, and transferring the second version of the requested file from the third device to the first device via the server.

2. The method of claim 1, further comprising communicating to the first device that the second device possesses the requested file.

3. The method of claim 1, further comprising maintaining a list indicating the second device having the file.

4. The method of claim 3, further comprising updating the list to indicate the first device having the file once the requested file is transferred from the second device to the first device and/or the second version of the requested file is transferred from the third device to the first device.

5. The method of claim 1, wherein the server and the plurality of the devices including the first device and the second device are coupled via a network including a wide area network (WAN), a local area network (LAN), an Intranet, and the Internet.

6. A system comprising:
a server coupled with a plurality of devices, the plurality of devices having a first device and a second device over a network, the server to
 maintain a directory at a server, the directory having a list of a plurality of devices, the directory further having a prioritized list of the plurality of devices having files,
 receive a request from the first device for a file, the first device including a client,
 seek a second device having the requested file by referencing the prioritized list of the plurality of devices, the second device being closest in proximity to the first device, the requested file having a first version,
 communicate a location of the second device to the first device,
 direct the first device to directly obtain the requested file from the second device,
 transfer the requested file from the second device to the first device, and
 update the requested file from The first version to a second version, wherein the second version being newer than the first version and residing at a third device of the plurality of devices, and redirect the first device to directly obtain the second version of the requested file having the second version from the third device, and transfer the second version of the requested file from the third device to the first device via the server.

7. The system of claim 6, wherein the server is further to communicate to the first device that the second device possesses the requested data.

8. The system of claim 6, wherein the server is further to maintain a list indicating the second device having the file.

9. The system of claim 8, wherein the server is farther to update the list to indicate the first device having the file once the requested file is transferred from the second device to the first device and/or the second version of the requested file is transferred from the third device to the first device.

10. The system of claim 6, wherein the network comprises a wide area network (WAN), a local area network (LAN), an Intranet, and the Internet.

11. A machine-readable storage medium comprising instructions which, when executed, cause a machine to:
 maintain a directory at a server, the directory having a list of a plurality of devices, the directory further having a prioritized list of the plurality of devices having files;
 receive a request from a first device for a file, the first device of the plurality of devices, the first device including a client coupled with the server;
 seek a second device having the requested file by referencing the prioritized list of the plurality of devices, the second device being closest in proximity to the first device, the requested file having a first version;
 communicate a location of the second device to the first device;
 direct the first device to directly obtain the requested file from the second device;
 transfer the requested file from the second device to the first device; and
 update the requested file from the first version to a second version, wherein the second version being newer than the first version and residing at a third device of the plurality of devices, and redirect the first device to directly obtain the second version of the requested file having the second version from the third device, and transfer the second version of the requested file from the third device to the first device via the server.

12. The machine-readable storage medium of claim 11, wherein the instructions which, when executed, further cause the machine to communicate to the first device that the second device possesses the requested file.

13. The machine-readable storage medium of claim 11, wherein the instructions which, when executed, further cause the machine to maintain a list indicating the second device having the file.

14. The machine-readable storage medium of claim 13, wherein the instructions which, when executed, further cause the machine to update the list to indicate the first device having the file once the requested file is transferred from the second device to the first device and/or the second version of the requested file is transferred from the third device to the first device.

15. The machine-readable storage medium of claim 11, wherein the sewer and the plurality of devices including the first device, and the second device are coupled via a network, the network including a wide area network (WAN), a local area network (LAN), an intranet, and the Internet.

* * * * *

UNITED STATES PATENT AND TRADEMARK OFFICE
CERTIFICATE OF CORRECTION

| | |
|---|---|
| PATENT NO. | : 7,562,112 B2 |
| APPLICATION NO. | : 10/095323 |
| DATED | : July 14, 2009 |
| INVENTOR(S) | : Harrow et al. |

It is certified that error appears in the above-identified patent and that said Letters Patent is hereby corrected as shown below:

In column 19, at line 36, delete, "farther" and insert --further--.

Signed and Sealed this

Fifth Day of October, 2010

David J. Kappos
*Director of the United States Patent and Trademark Office*